United States Patent
Tayagaki et al.

(10) Patent No.: US 10,774,192 B2
(45) Date of Patent: Sep. 15, 2020

(54) HOLLOW RESIN PARTICLES AND APPLICATION THEREOF

(71) Applicant: MATSUMOTO YUSHI-SEIYAKU CO., LTD., Yao-shi, Osaka (JP)

(72) Inventors: Naoya Tayagaki, Yao (JP); Katsushi Miki, Yao (JP)

(73) Assignee: MATSUMOTO YUSHI-SEIYAKU CO., LTD., Osaka (JP)

(*) Notice: Subject to any disclaimer, the term of this patent is extended or adjusted under 35 U.S.C. 154(b) by 57 days.

(21) Appl. No.: 16/322,218

(22) PCT Filed: Jul. 7, 2017

(86) PCT No.: PCT/JP2017/024889
§ 371 (c)(1),
(2) Date: Jan. 31, 2019

(87) PCT Pub. No.: WO2018/025575
PCT Pub. Date: Feb. 8, 2018

(65) Prior Publication Data
US 2019/0194415 A1  Jun. 27, 2019

(30) Foreign Application Priority Data

Aug. 2, 2016  (JP) .................. 2016-151631
Jan. 11, 2017  (JP) .................. 2017-002455

(51) Int. Cl.
*C08J 9/20* (2006.01)
*C08J 9/16* (2006.01)
(Continued)

(52) U.S. Cl.
CPC .............. *C08J 9/32* (2013.01); *B01J 13/18* (2013.01); *C08F 2/18* (2013.01); *C08F 2/44* (2013.01);
(Continued)

(58) Field of Classification Search
CPC ....... C08J 9/32; C08J 9/16; C08J 9/141; C08J 2333/18; C08J 3/126; C08J 9/232;
(Continued)

(56) References Cited

U.S. PATENT DOCUMENTS

2004/0091709 A1  5/2004 Ohmura et al.
2005/0080151 A1*  4/2005 Miki ................. C08J 9/32
521/50

(Continued)

FOREIGN PATENT DOCUMENTS

EP  1 149 628 A1  10/2001
EP  2 808 348 A1  12/2014
(Continued)

OTHER PUBLICATIONS

International Search Report of PCT/JP2017/024889 dated Aug. 15, 2017 [PCT/ISA/210].
(Continued)

*Primary Examiner* — Kara B Boyle
(74) *Attorney, Agent, or Firm* — Sughrue Mion, PLLC

(57) ABSTRACT

Hollow resin particles, a production process for producing the same and application thereof. The hollow resin particles include a thermoplastic resin shell and a hollow part surrounded by the shell. The thermoplastic resin is a polymer produced from a polymerizable component containing 0.6 to 3.0 wt % of a crosslinkable monomer having at least two polymerizable carbon-carbon double bonds per molecule and 97 to 99.4 wt % of an uncrosslinkable monomer having one polymerizable carbon-carbon double bond per molecule. A blowing agent is encapsulated in the hollow resin particles. The blowing agent contains 50 to 100 wt % of an organic compound having a vapor pressure higher than 100 kPa at 25° C. Further, the encapsulation ratio of the blowing agent ranges from 3 to 13 wt % of the hollow resin particles.

16 Claims, 3 Drawing Sheets

(51) Int. Cl.

| | |
|---|---|
| *C08J 9/228* | (2006.01) |
| *C08J 9/232* | (2006.01) |
| *C08J 9/32* | (2006.01) |
| *C08F 2/18* | (2006.01) |
| *C08F 2/44* | (2006.01) |
| *C08L 27/06* | (2006.01) |
| *B01J 13/18* | (2006.01) |
| *C08F 220/48* | (2006.01) |
| *C08F 220/46* | (2006.01) |
| *C08L 33/18* | (2006.01) |
| *C08J 9/14* | (2006.01) |

(52) U.S. Cl.
CPC .......... *C08F 220/46* (2013.01); *C08F 220/48* (2013.01); *C08J 9/16* (2013.01); *C08L 27/06* (2013.01); *C08L 33/18* (2013.01); *C08J 9/141* (2013.01); *C08J 2333/18* (2013.01); *C08L 2205/20* (2013.01); *C08L 2207/53* (2013.01)

(58) Field of Classification Search
CPC ...... C08J 9/20; C08J 2203/22; C08J 2353/00; C08J 2201/034; C08J 2201/026; C08J 9/228; C08L 27/06; C08L 33/18; C08L 2205/20; C08L 2207/53; B01J 13/18; C08F 220/48; C08F 220/46; C08F 2/18; C08F 2/44
See application file for complete search history.

(56) References Cited

U.S. PATENT DOCUMENTS

| | | |
|---|---|---|
| 2007/0154711 A1 | 7/2007 | Masuda et al. |
| 2009/0149559 A1* | 6/2009 | Masuda ................ C08F 220/44 |
| | | 521/56 |
| 2016/0160000 A1 | 6/2016 | Sakabe et al. |

FOREIGN PATENT DOCUMENTS

| | | |
|---|---|---|
| JP | 62-201231 A | 9/1987 |
| JP | 62-286534 A | 12/1987 |
| JP | 04-108570 A | 4/1992 |
| JP | 2006-096963 A | 4/2006 |
| JP | 2006-213930 A | 8/2006 |
| JP | 2009-540047 A | 11/2009 |
| JP | 2010-090299 A | 4/2010 |
| JP | 2011-195813 A | 10/2011 |
| JP | 2013-237815 A | 11/2013 |
| JP | 2016-050295 A | 4/2016 |
| WO | 02/072671 A2 | 9/2002 |
| WO | 2007/142593 A1 | 12/2007 |
| WO | 2014/196625 A1 | 12/2014 |

OTHER PUBLICATIONS

Communication dated Dec. 10, 2019 from the European Patent Office in corresponding Application No. 17836682.9.

* cited by examiner

HOLLOW RESIN PARTICLES AND APPLICATION THEREOF

CROSS-REFERENCE TO RELATED APPLICATIONS

This application is a § 371 of International Application No. PCT/JP2017/024889 filed Jul. 7, 2017 which claims priority from Japanese Patent Application No. 2016-151631 filed Aug. 2, 2016 and Japanese Patent Application No. 2017-002455 filed Jan. 11, 2017.

BACKGROUND OF THE INVENTION

1. Field of the Invention

The present invention relates to hollow resin particles and application thereof.

2. Description of the Related Art

In automobile assembly processes, thermoplastic or thermosetting organic resin base materials including PVC, polyurethane and epoxy resin have been conventionally employed.

These organic resin base materials are used as a sealant to attain airtightness or water-tightness at joints of automobiles, underbody coating to protect automobile bodies and vibration damping material for automobiles.

The recent trend of growing awareness to environmental problems such as global warming and air pollution has increased the demand for reducing the weight of automobiles to improve their fuel efficiency. Thus, automobile manufacturers have been trying to reduce the weight of automotive parts as well as the weight of organic resin base materials.

Organic resin base materials are now generally applied to automotive parts and bodies by robots with the advancement of automatization of automobile manufacturing. The productivity improvement in automobile manufacturing processes has been simultaneously studied, and the use of hollow particles has been examined to reduce the weight of sols used as the paint in the manufacturing processes.

PTL 1 proposes an automotive sealant prepared by adding hollow glass or shirasu (pyroclastic flow deposit) particles to a vinyl chloride plastisol.

Hollow glass particles, however, have a higher specific gravity than hollow resin particles and are disadvantageous because of their limitation and cost in weight reduction. In addition, the high hardness of the glass particles causes abrasion on manufacturing facilities which considerably decreases productivity.

On the other hand PTL 2 proposes hollow resin particles. Although hollow resin particles are highly lightweight and thus much more advantageous than hollow glass particles, hollow resin particles are apt to rupture due to their extremely thin shell. Hollow resin particles are apt to rupture composed of an insufficiently strong shell often rupture or dent in mixing with other materials, pneumatic transportation or pressurized extrusion. Thus, hollow resin particles cannot attain a sufficient lightweight effect in manufacturing products.

PTL 2 also proposes hollow resin particles with improved pressure resistance which enables the use of the hollow resin particles without rupture in pneumatic transportation. The pressure resistance of the hollow resin particles, however, is insufficient for practical applications where hollow resin particles used in manufacturing processes require a pressure resistance which can maintain their spherical shape under a pressure of at least 20 MPa. Thus, hollow resin particles having a pressure resistance sufficient for practical use have not been manufactured, and the effect by hollow resin particles has not yet been achieved.

The use of hollow resin particles has also been studied by blending in curable compositions used as sealants, adhesives and paints for buildings and civil engineering works in order to achieve a lightweight effect, an increased volume per unit weight of materials and impart other functionalities. A curable composition containing hollow resin particles, which is dispensed from a cartridge by a dispensing gun, sometimes leaks from the nozzle of the cartridge after stopping the dispensing action (the leak is referred to as "post-dispensing drool"). The leak of a curable composition has been a problem to be solved.

The post-dispensing drool of a curable composition containing conventional hollow resin particles was considered to have been caused by recovery of the hollow resin particles from a dent. The recovery occurs when low pressure applied to the curable composition in a cartridge decreases some time after stopping the dispensing operation during which the elastic hollow resin particles were dented by the low pressure.

PTL 3 also proposes hollow resin particles for solving "post-dispensing drool", though the particles have insufficient properties for practical use and further improvement is required.

[PTL 1] Japanese Patent Application Publication 1992-108570

[PTL 2] Japanese Patent Application Publication 2010-090299

[PTL 3] Japanese Patent Application Publication 2013-237815

SUMMARY OF THE INVENTION

It is therefore an object of the present invention to provide hollow resin particles having excellent pressure resistance, a process for producing the same and applications thereof in order to solve the above-noted problems.

The present inventors found that the above problem can be solved by providing hollow resin particles which comprise a polymer shell produced from a specific composition of a polymerizable component and a specific composition of a blowing agent encapsulated therein in a specific amount, to thereby achieve the present invention.

The hollow resin particles of the present invention comprise a thermoplastic resin shell and a hollow part surrounded by the shell; wherein the thermoplastic resin is a polymer produced from a polymerizable component containing 0.6 to 3.0 wt % of a crosslinkable monomer having at least two polymerizable carbon-carbon double bonds per molecule and 97 to 99.4 wt % of an uncrosslinkable monomer having one polymerizable carbon-carbon double bond per molecule; a blowing agent is encapsulated in the hollow resin particles; the blowing agent contains 50 to 100 wt % of an organic compound having a vapor pressure higher than 100 kPa at 25° C.; and the encapsulation ratio of the blowing agent ranges from 3 to 13 wt % of the hollow resin particles.

In various preferred embodiments, the hollow resin particles of the invention satisfy at least one of the following requirements.

1) The uncrosslinkable monomer contains a nitrile monomer in an amount ranging from 70 to 99.8 wt % of the uncrosslinkable monomer.

2) The amount of acrylonitrile in the uncrosslinkable monomer ranges from 60 to 93 wt %.

3) The nitrile monomer contains acrylonitrile and methacrylonitrile in a weight ratio (the weight ratio of acrylonitrile to methacrylonitrile) ranging from 65:35 to 99:1.

4) The uncrosslinkable monomer contains acrylonitrile and methyl methacrylate, and the total amount of the acrylonitrile and methyl methacrylate ranges from 90 to 100 wt % of the uncrosslinkable monomer.

5) The escape-initiation temperature of the blowing agent is not lower than 110° C.

Fine-particle-coated hollow resin particles of the present invention comprise the hollow resin particles mentioned above and a fine particle coating the outer surface of the shell of the hollow resin particles.

Wet-powdery hollow resin particles of the present invention comprise the hollow resin particles mentioned above and a liquid organic compound or water.

The process for producing the hollow resin particles of the present invention includes a step 1 which comprises dispersing an oily mixture containing a polymerizable component and blowing agent in an aqueous dispersion medium and polymerizing the polymerizable component into heat-expandable microspheres and a step 2 which comprises thermally expanding the heat-expandable microspheres produced in the step 1. In step 1, the polymerizable component contains 0.6 to 3.0 wt % of a crosslinkable monomer having at least two polymerizable carbon-carbon double bonds per molecule and 97 to 99.4 wt % of an uncrosslinkable monomer having one polymerizable carbon-carbon double bond per molecule, the amount of the blowing agent ranges from 4 to 15 parts by weight to 100 parts by weight of the polymerizable component, and the blowing agent contains 50 to 100 wt % of an organic compound having a vapor pressure higher than 100 kPa at 25° C. The true specific gravity of the heat-expandable microspheres produced in the step 1 preferably ranges from 1.02 to 1.3.

The composition of the present invention comprises a base component and at least one selected from the group consisting of the hollow resin particles, fine-particle-coated hollow resin particles and wet-powdery hollow resin particles.

The formed product of the present invention is manufactured by forming or molding the composition.

Advantageous Effects of Invention

The hollow resin particles of the present invention have considerably greater superior pressure resistance to conventional hollow resin particles. Thus the hollow resin particles of the present invention achieve a sufficient effect under high-pressure conditions where conventional hollow resin particles could not achieve the effect of decreasing the specific gravity of resultant products.

REFERENCE SYMBOLS LIST

Figure 1:
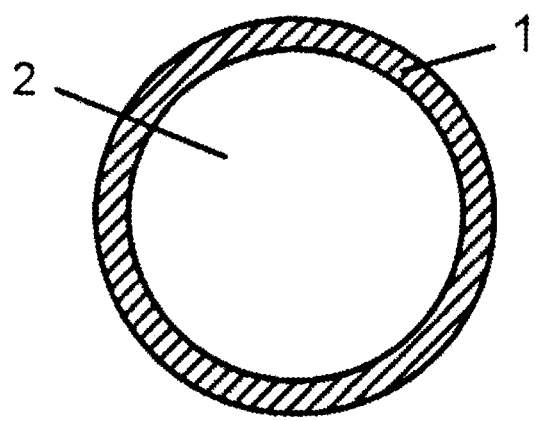
FIG. 1 is a schematic diagram of an example of the hollow resin particles.

Reference symbols used to identify various features in the drawings include the following.
1 Shell
2 Hollow part
3 Fine particle (in a state of adhesion)
4 Fine particle (in a state of fixation in a dent)
5 Fine-particle-coated hollow resin particles
8 Hot air nozzle
9 Refrigerant flow
10 Overheat prevention jacket
11 Distribution nozzle
12 Collision plate
13 Gas fluid containing heat-expandable microspheres
14 Gas flow
15 Hot airflow

DETAILED DESCRIPTION OF THE PREFERRED EMBODIMENTS

The hollow resin particles of the invention comprise a thermoplastic resin shell and a hollow part surrounded by the shell. The hollow resin particles of the invention are described in greater detail below with reference to the drawings. However, the present invention should not be construed as being limited thereto.

Hollow Resin Particles

As shown in FIG. 1, the hollow resin particles are composed of a thermoplastic resin shell 1 and a hollow part 2 surrounded by the shell 1. The hollow resin particles are almost spherical and have a hollow part 2 therein which forms a large cavity inside the hollow resin particles. The shape of the hollow resin particles can be exemplified by a soft tennis ball. The hollow resin particles of the invention are the expansion products of the heat-expandable microspheres described below.

The shell of the hollow resin particles has continuous inner and outer surfaces without edges and ends. The thickness of the shell, i.e., the distance between the inner and outer surfaces, is preferably uniform though a nonuniform thickness is acceptable.

Preferably, the shell of the hollow resin particles substantially comprises thermoplastic resin.

The thermoplastic resin constituting the shell is a polymer of a polymerizable component containing 0.6 to 3.0 wt % of a crosslinkable monomer having at least two polymerizable carbon-carbon double bonds per molecule and 97 to 99.4 wt % of an uncrosslinkable monomer having one polymerizable carbon-carbon double bond per molecule. As used herein, the polymerizable component means a monomer having at least one polymerizable group per molecule, and such polymerizable component includes a crosslinkable monomer having at least two polymerizable carbon-carbon double bonds per molecule (hereinafter referred to as crosslinkable monomer) and an uncrosslinkable monomer having one polymerizable carbon-carbon double bond per molecule (hereinafter referred to as uncrosslinkable monomer). The polymerizable carbon-carbon double bond includes the double bonds of a vinyl group, a methacryloyl group, an acryloyl group and an allyl group.

The polymerizable component contains 0.6 to 3.0 wt % of the crosslinkable monomer in 100 wt % of the polymerizable component. The polymerizable component containing the crosslinkable monomer in an amount within the above range is preferable because the resultant hollow resin particles have a dense and soft shell. Further, such hollow resin particles maintain a spherical shape under high pressure without rupturing or immediately recover from a deformed shape to a spherical shape by the internal pressure of the encapsulated blowing agent when released from high pressure. A polymerizable component containing less than 0.6 wt % of the crosslinkable monomer is polymerized into hollow resin particles having an insufficiently dense shell. The insufficiently dense shell makes the hollow resin particles rupture under high pressure or deform to a degree that cannot recover a spherical shape by the internal pressure of the encapsulated blowing agent when released from high pressure and thus the hollow resin particles fail to achieve a lightweight effect. On the other hand, a polymerizable component containing more than 3.0 wt % of the crosslinkable monomer is polymerized into hollow resin particles having an excessively stiff shell without softness. The stiff shell interferes with the recovery of the hollow resin particles from a deformed shape to spherical shape when released from high pressure, and thus the hollow resin particles fail to achieve a lightweight effect.

The lower limit of the amount of the crosslinkable monomer in the polymerizable component is preferably 0.7 wt %, more preferably 0.8 wt %, and most preferably 0.9 wt %. The upper limit of the amount is preferably 2.5 wt %, more preferably 2.0 wt %, and most preferably 1.6 wt %.

The crosslinkable monomer includes bifunctional crosslinkable monomers, trifunctional crosslinkable monomers, tetrafunctional crosslinkable monomers and crosslinkable monomers with higher functionality. One of or a combination of at least two of these crosslinkable monomers can be used.

The bifunctional crosslinkable monomers include alkanediol di(meth)acrylates, such as ethylene glycol di(meth)acrylate, 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, 3-methyl-1,5-pentanediol di(meth)acrylate and 2-methyl-1,8-octanediol di(meth)acrylate; polyalkylene glycol di(meth)acrylates, such as diethylene glycol di(meth)acrylate, triethylene glycol di(meth)acrylate, PEG (200) di(meth)acrylate, PEG (400) di(meth)acrylate, PEG (600) di(meth)acrylate, PEG (1000) di(meth)acrylate, dipropylene glycol di(meth)acrylate, tripropylene glycol di(meth)acrylate, polypropylene glycol (400) di(meth)acrylate, polypropylene glycol (700) di(meth)acrylate, polytetramethylene glycol di(meth)acrylate, polytetramethylene glycol (650) di(meth)acrylate and ethoxylated polypropylene glycol (700) di(meth)acrylate; and others such as ethoxylated bisphenol A di(meth)acrylate (with 2-30 moles EO), propoxylated bisphenol A di(meth)acrylate, ethoxylated propoxylated bisphenol A di(meth)acrylate, glycerin di(meth)acrylate, 2-hydroxy-3-acryloiloxylpropyl methacrylate, dimethylol-tricyclodecane di(meth)acrylate and divinylbenzene. In the above description, PEG means polyethylene glycol and (meth)acrylate means acrylate or methacrylate.

Of these bifunctional crosslinkable monomers, di(meth)acrylate monomers containing oxyethylene groups are preferable because they contain hydrophilic groups and are highly reactive near the surface of heat-expandable microspheres that are being polymerized to efficiently form a dense shell of the heat-expandable microspheres. Of these monomers, ethylene glycol di(meth)acrylate, diethylene glycol di(meth)acrylate, triethylene glycol di(meth)acrylate, PEG (200) di(meth)acrylate and ethoxylated bisphenol A di(meth)acrylate are preferred for their short molecular chains which are advantageous for forming a dense crosslinked structure.

The trifunctional crosslinkable monomers include ethoxylated glycerin triacrylate, 1,3,5-tri(meth)acryloyl hexahydro-1,3,5-triazine, triallyl isocyanurate, pentaerythritol tri(meth)acrylate, trimethylolpropane tri(meth)acrylate and 1,2,4-trivinyl benzene.

The tetrafunctional crosslinkable monomers and crosslinkable monomers with higher functionality include ditrimethylolpropane tetra(meth)acrylate, pentaerythritol tetra(meth)acrylate and dipentaerythritol hexa(meth)acrylate.

The amount of the bifunctional crosslinkable monomer in the crosslinkable monomer preferably ranges from 40 to 100 wt %. An amount in the above range is preferable because the hollow resin particles produced from the crosslinkable monomer containing such amount of a bifunctional crosslinkable monomer have a dense and soft shell which prevents rupture of the hollow resin particles under high pressure and allows the particles to recover from a deformed shape to a spherical form by the encapsulated blowing agent when released from the pressure. Hollow resin particles produced from the crosslinkable monomer containing the bifunctional crosslinkable monomer in an amount less than 40 wt % have an insufficiently dense shell and can rupture under high pressure or cannot recover from a deformed shape to a spherical form when released from the pressure. The lower limit of the amount of the bifunctional crosslinkable monomer is preferably 45 wt %, more preferably 60 wt % and most preferably 75 wt %. The upper limit of the amount of the bifunctional crosslinkable monomer is preferably 95 wt %, more preferably 93 wt % and most preferably 90 wt %.

The amount of the trifunctional crosslinkable monomer in the crosslinkable monomer preferably ranges from 0 to 60 wt %. An amount in the above range is preferable because the shell of the hollow resin particles produced from the crosslinkable monomer containing such an amount of trifunctional crosslinkable monomer has a dense network of crosslinking and softness which prevents rupture of the hollow resin particles under high pressure and allows the particles to recover from a deformed shape to a spherical form by the encapsulated blowing agent when released from the pressure. Hollow resin particles produced from the crosslinkable monomer containing a trifunctional crosslinkable monomer in an amount higher than 60 wt % have a shell with an excessively dense network without softness. Such hollow resin particles cannot recover from a deformed shape to a spherical form nor recover a hollow structure when released from pressure. Thus, the hollow resin particles can fail to decrease the specific gravity of the products containing the hollow resin particles. The lower limit of the amount of the trifunctional crosslinkable monomer is preferably 3 wt %, more preferably 5 wt % and most preferably 8 wt %. The upper limit of the amount of the trifunctional crosslinkable monomer is preferably 50 wt %, more preferably 40 wt % and most preferably 30 wt %.

The polymerizable component contains 97 to 99.4 wt % of the uncrosslinkable monomer in 100 wt % of the polymerizable component. The lower limit of the amount of the uncrosslinkable monomer in the polymerizable component is preferably 97.5 wt %, more preferably 98.0 wt %, and most preferably 98.5 wt %. The upper limit of the amount is preferably 99.3 wt %, more preferably 99.2 wt %, and most preferably 99.1 wt %.

The uncrosslinkable monomer is not specifically restricted, and includes, for example, nitrile monomers such as acrylonitrile, methacrylonitrile, fumaronitrile and maleonitrile; vinyl halide monomers, such as vinyl chloride; vinylidene halide monomers, such as vinylidene chloride; vinyl ester monomers, such as vinyl acetate, vinyl propionate and vinyl butyrate; carboxyl-group-containing monomers, such as unsaturated monocarboxylic acids including acrylic acid, methacrylic acid, ethacrylic acid, crotonic acid and cinnamic acid, unsaturated dicarboxylic acids including maleic acid, itaconic acid, fumaric acid, citraconic acid and chloromaleic acid, anhydrides of unsaturated dicarboxylic acids, and monoesters of unsaturated dicarboxylic acids including monomethyl maleate, monoethyl maleate, monobutyl maleate, monomethyl fumarate, monoethyl fumarate, monomethyl itaconate, monoethyl itaconate and monobutyl itaconate; (meth)acrylate monomers, such as methyl (meth)acrylate, ethyl (meth)acrylate, n-butyl (meth) acrylate, t-butyl (meth)acrylate, 2-ethylhexyl (meth)acrylate, stearyl (meth)acrylate, phenyl (meth)acrylate, isobornyl (meth)acrylate, cyclohexyl (meth)acrylate, benzyl (meth)acrylate and 2-hydroxyethyl (meth)acrylate; (meth) acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrrolidone; and vinyl naphthalene salts. A part of or the whole of the carboxyl groups of the carboxyl-group-containing monomers can be neutralized during or after the polymerization. Acrylic acids and methacrylic acids are collectively referred to as (meth)acrylic acids. The word, (meth)acrylate, means acrylate or methacrylate and the word, (meth)acryl, means acryl or methacryl. One of or a combination of at least two of the uncrosslinkable monomers can be used.

The uncrosslinkable monomer containing a nitrile monomer is preferable for producing hollow resin particles. This is because the shell of such hollow resin particles has a high gas barrier effect to prevent encapsulated blowing agent, such as low-boiling-point hydrocarbons, from escaping the shell and to maintain a high internal pressure of the hollow resin particles so as to further improve the pressure resistance of the particles. The amount of the nitrile monomer in the uncrosslinkable monomer preferably ranges from 70 to 99.8 wt %. The lower limit of the amount of the nitrile monomer is preferably 80 wt %, more preferably 83 wt % and most preferably 88 wt %. The upper limit of the amount of the trifunctional crosslinkable monomer is preferably 97 wt % and more preferably 92 wt %.

The uncrosslinkable monomer containing acrylonitrile as the nitrile monomer is preferable for producing hollow resin particles. This is because the shell of such hollow resin particles has an improved gas barrier effect and rigidity to prevent the hollow resin particles from becoming dented by external pressure and thereby attain better pressure resistance of the particles. The uncrosslinkable monomer containing acrylonitrile is also preferable because the resultant hollow resin particles have improved resistance to the stress or frictional force imparted by mixing the particles with base components owing to the improved rigidity of the shell. The acrylonitrile in the uncrosslinkable monomer is also preferable for improving the solvent resistance of the shell of the resultant hollow resin particles to enable the particles to be used with a wider range of solvents.

The amount of the acrylonitrile in the uncrosslinkable monomer preferably ranges from 60 to 93 wt %. The preferable lower limit of the amount is 70 wt % and the preferable upper limit of the amount is 88 wt %.

The uncrosslinkable monomer containing both acrylonitrile (AN) and methacrylonitrile (MAN) is preferable for producing hollow resin particles. This is because the shell of such hollow resin particles has a high density to prevent encapsulated blowing agent from escaping the shell and to maintain a high internal pressure of the hollow resin particles so as to attain better pressure resistance of the particles.

The weight ratio of AN to MAN in the uncrosslinkable monomer preferably ranges from 65:35 to 99:1, more preferably from 70:30 to 90:10, further more preferably from 73:27 to 87:13 and most preferably from 73:27 to 80:20. The uncrosslinkable monomer containing AN and MAN in a weight ratio within the above range contributes to producing heat-expandable microspheres having a soft and dense shell. Thus, the resultant hollow resin particles are highly lightweight and have excellent pressure resistance.

The combination of acrylonitrile (AN) and methyl methacrylate (MMA) constituting the uncrosslinkable monomer contributes to producing heat-expandable microspheres having a shell with good stretching behavior in heating and softening, a high gas barrier effect, rigidity and toughness. Thus, the resultant hollow resin particles are highly lightweight and have excellent pressure resistance.

The total amount of AN and MMA in the uncrosslinkable monomer preferably ranges from 90 to 100 wt %. The lower limit of the amount is preferably 93 wt % and more preferably 95 wt %, and the upper limit should preferably be 99 wt %.

The weight ratio of AN to MMA in the uncrosslinkable monomer preferably ranges from 68:32 to 93:7 and more preferably from 75:25 to 90:10. The uncrosslinkable monomer containing AN and MMA in a weight ratio within the above range contributes to producing heat-expandable microspheres having a shell with good stretching behavior in heating and softening, a high gas barrier effect, rigidity and toughness. Thus, the resultant hollow resin particles are highly lightweight and have excellent pressure resistance.

The uncrosslinkable monomer containing a carboxyl-group-containing monomer is preferable for improved heat resistance of the resultant hollow resin particles. Of these carboxyl-group-containing monomers, acrylic acid, methacrylic acid, maleic acid, maleic acid anhydride and itaconic acid are preferable, acrylic acid and methacrylic acid are more preferable, and methacrylic acid is most preferable for its effect in improving the heat resistance of the resultant hollow resin particles.

The amount of the carboxyl-group-containing monomer in the uncrosslinkable monomer preferably ranges from 2.0 to 27 wt %. The uncrosslinkable monomer containing the carboxyl-group-containing monomer in an amount less than 2.0 wt % can cause insufficient heat resistance of the hollow resin particles to result in an increased specific gravity of the hollow resin particles after heating. On the other hand, the uncrosslinkable monomer containing the carboxyl-group-containing monomer in an amount higher than 27 wt % can cause the resultant hollow resin particles to have a fragile shell and thereby decrease the pressure resistance of the particles.

The lower limit of the amount of the carboxyl-group-containing monomer is preferably 5.0 wt %, more preferably 10 wt % and most preferably 14 wt %. The upper limit of the amount of the carboxyl-group-containing monomer is preferably 25 wt %, more preferably 23 wt % and most preferably 21 wt %.

The combination of acrylonitrile (AN) and methacrylic acid (MAA) contained in the uncrosslinkable monomer contributes to producing heat-expandable microspheres having a shell with good stretching behavior in heating and softening, a high gas barrier effect, rigidity and toughness. Thus, the resultant hollow resin particles are highly lightweight and have excellent pressure resistance.

The shell of the hollow resin particles can comprise a thermosetting resin, a suspension agent and an electrolyte in addition to the thermoplastic resin mentioned above.

The thermosetting resin includes, for example, epoxy resin, phenol resin, melamine resin, urea resin, polyimide resin and bismaleimide resin, and epoxy resin is preferable. The amount of the thermosetting resin constituting the hollow resin particles is not specifically restricted, and preferably ranges from 0 to 10 parts by weight to 100 parts by weight of the thermoplastic resin constituting the particles.

The suspension agent includes colloidal silica, magnesium hydroxide, calcium phosphate, calcium carbonate, barium sulfate, calcium oxalate, methyl cellulose, hydroxypropyl methyl cellulose, carboxymethyl cellulose, bentonite and starches. The suspension agent mentioned herein includes both the dispersion stabilizer and dispersion stabilizing auxiliary used in the process for producing the heat-expandable microspheres. In the case that the shell of the hollow resin particles contains a suspension agent, it exists mainly on the outer surface of the shell. The amount of the suspension agent contained in the hollow resin particles is not specifically restricted and preferably ranges from 0 to 5 parts by weight and more preferably from 1 to 3 parts by weight to 100 parts by weight of the thermoplastic resin constituting the particles.

The electrolyte includes sodium chloride, magnesium chloride, calcium chloride, sodium sulfate, magnesium sulfate, ammonium sulfate and sodium carbonate. The amount of the electrolyte contained in the hollow resin particles is not specifically restricted and preferably ranges from 0 to 5 parts by weight and more preferably from 1 to 3 parts by weight to 100 parts by weight of the thermoplastic resin constituting the hollow resin particles.

Inorganic substances derived from the suspension agent and electrolyte contained in the shell of the hollow resin particles can remain as ash after the hollow resin particles are ignited to completely decompose organic substances.

The amount of the ash (ignition residue) from the hollow resin particles is not specifically restricted and preferably not higher than 10 wt % and more preferably not higher than 5 wt % of the particles. The ash from the hollow resin particles mentioned herein means the quantity determined according to the procedure described in the Examples.

A blowing agent is encapsulated in the hollow resin particles. The blowing agent is not specifically restricted if it is thermally vaporizable, and includes, for example, $C_3$-$C_{13}$ hydrocarbons such as methane, ethane, propane, (iso)butane, (iso)pentane, (iso)hexane, (iso)heptane, (iso)octane, (iso)nonane, (iso)decane, (iso)undecane, (iso)dodecane and (iso)tridecane; hydrocarbons having a carbon number greater than 13 and not greater than 20, such as (iso)hexadecane and (iso)eicosane; hydrocarbons from petroleum fractions such as pseudocumene, petroleum ether, and normal paraffins and isoparaffins having an initial boiling point ranging from 150 to 260° C. and/or being distilled at a temperature ranging from 70 to 360° C.; halides of $C_1$-$C_{12}$ hydrocarbons, such as methyl chloride, methylene chloride, chloroform and carbon tetrachloride; fluorine-containing compounds, such as hydrofluoroether; silanes having $C_1$-$C_5$ alkyl groups, such as tetramethyl silane, trimethylethyl silane, trimethylisopropyl silane and trimethyl-n-propyl silane; and compounds which thermally decompose to generate gases, such as azodicarbonamide, N,N'-dinitrosopentamethylenetetramine and 4,4'-oxybis(benzenesulfonyl hydrazide). The blowing agent can be composed of one of or a combination of at least two of these compounds. The blowing agent can be any of linear, branched or alicyclic compounds, and are preferably aliphatic compounds.

The blowing agent is essentially gaseous and encapsulated in the hollow part of the hollow resin particles. A part of the blowing agent can be in the form of a liquid or a solid and encapsulated in the hollow resin particles.

The blowing agent of the hollow resin particles of the present invention contains an organic compound having a vapor pressure higher than 100 kPa at 25° C. in an amount ranging from 50 to 100 wt %. The blowing agent containing the organic compound having a vapor pressure higher than 100 kPa at 25° C. in an amount within the above range maintains a very high internal pressure of the hollow resin particles in a usual manufacturing or processing environment to impart a high repulsion force against external load, in other words, a high pressure resistance, to the particles. The lower limit of the amount of the organic compound is preferably 65 wt % and more preferably 80 wt %, and the upper limit of the amount of the organic compound is preferably 99 wt % and more preferably 98 wt %.

The organic compound having a vapor pressure higher than 100 kPa at 25° C. is not specifically restricted and includes, for example, methyl chloride, methane, ethane, propane and (iso) butane, and isobutane is preferred among these compounds. Isobutane contributes to high internal pressure of the hollow resin particles, and prevents the blowing agent from escaping the shell of the particles so as to attain a high lightweight effect and pressure resistance of the hollow resin particles. One of or a combination of at least two of the organic compounds having a vapor pressure higher than 100 kPa at 25° C. can be used as the blowing agent.

The hollow resin particles can contain moisture. The moisture content of the hollow resin particles usually ranges from 0 to 5 wt %, though the moisture content can be controlled within a range of 0 to 1 wt % by various drying methods. The drying methods include drying in a desiccator with a drying agent, drying with warm or hot air, vacuum drying and drying with infrared or electron irradiation.

The moisture content of the hollow resin particles is preferably not higher than 1 wt %, more preferably not higher than 0.7 wt %, further more preferably not higher than 0.5 wt %, yet further more preferably not higher than 0.3 wt % and most preferably 0 wt %.

The encapsulation ratio of the blowing agent in the hollow resin particles should range from 3 to 13 wt %. An encapsulation ratio within the above range contributes to high internal pressure and sufficient thickness of the shell of the hollow resin particles so as to attain a high pressure resistance of the particles. An encapsulation ratio lower than 3 wt % results in insufficient internal pressure and pressure resistance of the hollow resin particles, and such particles cannot sufficiently recover from rupture or deformation due to high external pressure. The encapsulation ratio of the blowing agent of the hollow resin particles as used herein means the weight fraction of the blowing agent to the hollow resin particles. Specifically the encapsulation ratio is defined as that determined in the procedure described in the Examples.

The lower limit of the encapsulation ratio of the blowing agent in the hollow resin particles is preferably 3 wt % and more preferably 4 wt %, and the upper limit is preferably 11 wt % and more preferably 10 wt %.

The escape-initiation temperature of the blowing agent in the hollow resin particles is preferably not lower than 110° C., more preferably not lower than 115° C. and further more preferably not lower than 120° C. The escape-initiation temperature of the blowing agent lower than 110° C. can result in the hollow resin particles having an insufficiently dense shell which cannot attain high pressure resistance of the particles.

The preferable upper limit of the escape-initiation temperature of the blowing agent is 350° C. An escape-initiation temperature of the blowing agent higher than 350° C. can result in the hollow resin particles having an insufficiently soft shell which cannot attain high pressure resistance of the particles. The escape-initiation temperature of the blowing agent in the hollow resin particles as used herein is defined as that determined in the procedure described in the Examples.

Although the hollow resin particles of the invention have a very high internal pressure, the highly dense shell of the particles prevents the blowing agent from escaping the shell to attain high pressure resistance of the particles.

The hollow part of the hollow resin particles is almost spherical and contacts the inner surface of the shell. Each of the hollow resin particles preferably has only one hollow part, though a plurality of hollow part can exist in one hollow resin particle. Specifically, the hollow part is filled with a gaseous blowing agent, though the air introduced from the outside can be contained in the hollow part.

The mean volume diameter (D50) of the hollow resin particles is not specifically restricted and preferably ranges from 10 to 300 μm. Hollow resin particles having a mean volume diameter smaller than 10 μm can have an insufficiently thick shell which cannot attain high pressure resistance of the particles. The hollow resin particles having a mean volume diameter larger than 300 μm can contain a plurality of hollow parts per each particle and the shell of such particles has a nonuniform thickness to cause the escape of blowing agent and thereby fails to attain sufficient pressure resistance.

The lower limit of the mean volume diameter of the hollow resin particles should preferably 30 μm and more preferably 40 μm, and the upper limit of the mean volume diameter is preferably 250 μm and more preferably 200 μm. The mean volume diameter is determined in the procedure described in the Examples.

The coefficient of variation of the particle size distribution of the hollow resin particles is not specifically restricted, and is preferably not greater than 35%, more preferably not greater than 30%, and most preferably not greater than 25%. The coefficient of variation, CV, can be calculated by the following formulae (1) and (2):

$$CV = (s/\langle x \rangle) \times 100(\%) \quad (1)$$

$$s = \left\{ \sum_{i=1}^{n} (xi - \langle x \rangle)^2 / (n-1) \right\}^{1/2} \quad (2)$$

(where "s" is a standard deviation of the particle size of the particles, <x> is a mean particle size of the particles, "xi" is the particle size of the i-th particle, and "n" represents the number of particles)

A coefficient of variation of the particle size distribution higher than 35% represents that the hollow resin particles have a wide particle size distribution, in other words, contain a considerable amount of fine and coarse particles which impair high pressure resistance of the particles.

The ratio of the shell thickness ($r_1$) to the mean volume diameter ($r_2$) of the hollow resin particles is represented by $r_1/r_2$. The ratio ($r_1/r_2$) is not specifically restricted and preferably ranges from 0.001 to 0.01. Hollow resin particles having the ratio of the shell thickness ($r_1$) to the mean volume diameter ($r_2$) within the above range have a sufficient shell thickness to retain the encapsulated blowing agent and thus have high pressure resistance.

The true specific gravity of the hollow resin particles is not specifically restricted and preferably ranges from 0.01 to 0.10. Hollow resin particles having a true specific gravity lower than 0.01 have a thin shell which cannot bear high pressure, and thus the particles do not have high pressure resistance. On the other hand, hollow resin particles having a true specific gravity higher than 0.10 can have an excessively thick shell with extreme denseness and rigidity, and cannot recover from deformation with the aid of the internal pressure by the encapsulated blowing agent when released from pressure. Such particles remain in a dented form but not in the form of lightweight spherical hollow resin particles and thus fail to attain a lightweight effect.

The lower limit of the true specific gravity of the hollow resin particles preferably is 0.030 and more preferably 0.040, and the upper limit of the true specific gravity preferably is 0.08 and more preferably 0.06. The true specific gravity of the hollow resin particles is determined in the procedure described in the Examples.

The hollow resin particles can have further expansion performance. The further expansion performance means a property which allows the hollow resin particles to further expand (re-expand) by heating.

The further expansion ratio of the hollow resin particles is not specifically restricted and preferably ranges from 5 to 80%. Hollow resin particles having a further expansion ratio lower than 5% indicates that the particles can have poor performance in retaining the blowing agent or fail to retain a sufficient amount of blowing agent encapsulated in their shell and thus fail to have high pressure resistance. On the other hand, hollow resin particles having a further expansion ratio higher than 80% indicates that the particles can fail to attain a sufficient lightweight effect.

The lower limit of the further expansion ratio is preferably 10% and more preferably 15%, and the upper limit of the further expansion ratio should preferably be 70% and more preferably 60%.

The further expansion ratio represents the degree of the re-expansion of hollow resin particles which are re-expanded to a maximum degree. The further expansion ratio is calculated by the following formula (3) from the true specific gravity of hollow resin particles ($d_A$) and the true specific gravity of the re-expanded hollow resin particles ($d_B$).

$$\text{Further expansion ratio (\%)} = (1 - d_B/d_A) \times 100 \quad (3)$$

Heat-expandable microspheres, which are expanded in a thermal expansion step during which the softened shell stretches and expands with an increasing volume of the blowing agent, are processed into very lightweight hollow resin particles. The state of the maximum expansion of the microspheres means the limit state of the particles to retain the encapsulated blowing agent.

Fine-Particle-Coated Hollow Resin Particles

Another preferable embodiment of the present invention relates to fine-particle-coated hollow resin particles composed of the hollow resin particles described above and the fine particles coating the outer surface of the shell of the hollow resin particles. The fine particles as used herein is a powder composed of inorganic or organic substances described below and which coats the hollow resin particles to control scattering of the particles and improve the handling property and dispersibility in binders of the particles. Some of the fine particles described herein can be the same as that used as the suspension agent described above. However, the fine particles of the invention specifically mean an inorganic or organic powder used to coat the hollow resin particles in order to attain the above-mentioned effect and used at a different point of time from that of the suspension agent in the process of producing hollow resin particles. In the invention, hollow resin particles containing 10 wt % or more of ash are categorized as fine-particle-coated hollow resin particles and not as hollow resin particles.

Figure 2:
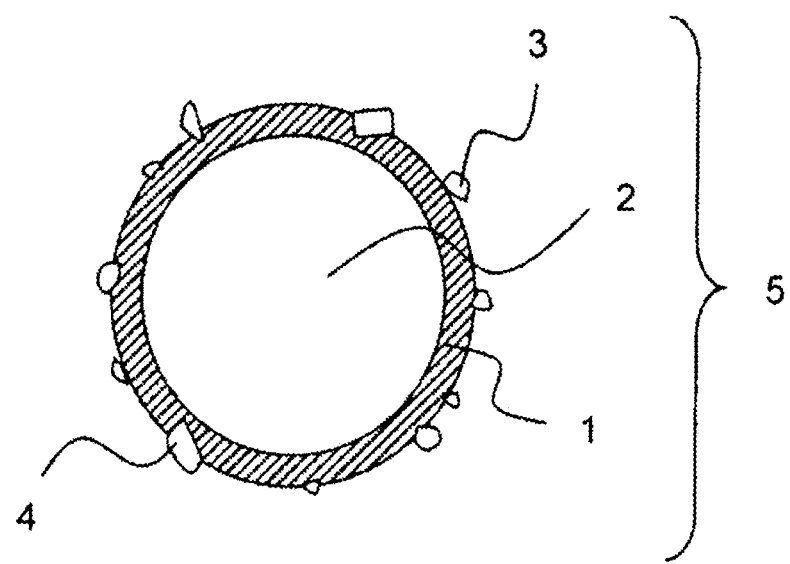
FIG. 2 is a schematic diagram of an example of the fine-particle-coated hollow resin particles.

The fine-particle-coated hollow resin particles are composed of hollow resin particles and fine particles coating the surface of the shell of the particles as shown in FIG. 2.

The coating mentioned herein means that the fine particles (3 and 4) are in a state of adhesion (3) on the outer surface of the shell (1) of the hollow resin particles, or in a state of fixation in a dent (4) on the outer surface of the shell of the hollow resin fine particles as the result of the fine particles pushing into the thermoplastic resin shell softened or melted by heat. The particle shape of the fine particles can be irregular or spherical.

The fine particles can be selected from various materials including both inorganic and organic materials. The shape of the fine particles includes spherical, needle-like and plate-like shapes.

The inorganic compounds for the fine particles are not specifically restricted, and include, for example, wollastonite, sericite, kaolin, mica, clay, talc, bentonite, aluminum silicate, pyrophyllite, montmorillonite, calcium silicate, calcium carbonate, magnesium carbonate, dolomite, calcium sulfate, barium sulfate, glass flake, boron nitride, silicon carbide, silica, alumina, isinglass, titanium dioxide, zinc oxide, magnesium oxide, zinc oxide, hydrotalcite, carbon black, molybdenum disulfide, tungsten disulfide, ceramic beads, glass beads, crystal beads and glass microballoons.

The organic compounds for the fine particles are not specifically restricted, and include, for example, sodium carboxymethyl cellulose, hydroxyethyl cellulose, methyl cellulose, ethyl cellulose, nitro cellulose, hydroxypropyl cellulose, sodium alginate, polyvinyl alcohol, polyvinyl pyrrolidone, sodium polyacrylate, carboxyvinyl polymer, polyvinyl methyl ether, magnesium stearate, calcium stearate, zinc stearate, polyethylene wax, lauric amide, myristic amide, palmitic amide, stearic amide, hydrogenated castor oil, (meth)acrylic resin, polyamide resin, silicone resin, urethane resin, polyethylene resin, polypropylene resin and fluorine resin.

The inorganic and organic compounds constituting the fine particles can be surface-treated with a surface-treatment agent, such as a silane coupling agent, paraffin wax, fatty acid, resin acid, urethane compound and fatty acid ester, or need not be surface-treated.

The mean particle size of the fine particles preferably ranges from 0.001 to 30 μm, more preferably from 0.005 to 25 μm, and most preferably from 0.01 to 20 μm. The mean particle size of the fine particles described herein is determined by laser diffractometry.

The ratio of the mean particle size of the fine particles to the mean particle size of the hollow resin particles (the mean particle size of the fine particles/the mean particle size of the hollow resin particles) is preferably not higher than 1 for sufficiently coating the particles with the fine particles, more preferably not higher than 0.1 and further more preferably not higher than 0.05.

The amount of the fine particles to the weight of the fine-particle-coated hollow resin particles is not specifically restricted, and is preferably not higher than 95 wt %, more preferably not higher than 90 wt %, further more preferably not higher than 85 wt % and most preferably not higher than 80 wt %. An amount of the fine particles higher than 95 wt % can result in an increased amount of the fine-particle-coated hollow resin particles added to a composition so as to decrease the cost performance of the fine-particle-coated hollow resin particles. The lower limit of the amount is preferably 20 wt % and more preferably 40 wt %.

The true specific gravity of the fine-particle-coated hollow resin particles is not specifically restricted and preferably ranges from 0.04 to 0.40. Fine-particle-coated hollow resin particles having a true specific gravity lower than 0.04 can have a thin shell which leads to poor pressure resistance of the particles. On the other hand, fine-particle-coated hollow resin particles having a true specific gravity higher than 0.4 can fail to attain sufficient lightweight effect.

The lower limit of the true specific gravity of the fine-particle-coated hollow resin particles is preferably 0.10 and more preferably 0.12, and the upper limit of the true specific gravity should preferably be 0.30 and more preferably 0.20.

Wet-Powdery Hollow Resin Particles

Another preferable embodiment of the invention relates to wet-powdery hollow resin particles comprising the hollow resin particles described above and a liquid organic compound or water. Wet-powdery hollow resin particles have good handling properties owing to their low scattering propensity as well as the fine-particle-coated hollow resin particles.

The wet-powdery hollow resin particles comprise the hollow resin particles, and a liquid organic compound (hereinafter referred to as oil-wet hollow resin particles) of the present invention is a composition substantially containing the hollow resin particles and at least 5 wt % of a liquid organic compound. The oil-wet hollow resin particles are highly compatible with organic base components and are preferably used to sufficiently disperse the hollow resin particles in an organic base component.

The liquid organic compound is not specifically restricted, and satisfies the basic requirements of (i) having a boiling point higher than the evaporation point of the blowing agent, and (ii) having no properties of dissolving or swelling the thermoplastic resin constituting the shell of the hollow resin particles.

For satisfying the requirement (i) and preventing the evaporation of the liquid organic compound during storage, the liquid organic compound preferably has a boiling point ranging from 80 to 270° C., more preferably from 90 to 260° C. and most preferably from 100 to 250° C.

The liquid organic compound is not specifically restricted, and includes, for example, plasticizers, such as dibutyl phthalate, diisooctyl phthalate, diisononyl phthalate, dioctyl adipate, tricresyl phosphate, triethyl citrate, acetylbutyl citrate and octyl alcohol; and monomers, such as dicyclopentane and styrene. The liquid organic compounds other than those mentioned above include, for example, nonionic surfactants, alkylene glycols, polyalkylene glycols, glycerin, process oils, silicone oils, liquid paraffin, naphthenic oils, aromatic oils, other fats and oils and mineral oils. One of or a combination of at least two of the above liquid organic compounds can be used.

The amount of the hollow resin particles in the oil-wet hollow resin particles preferably ranges from 8 to 70 wt %. The oil-wet hollow resin particles containing the hollow resin particles in an amount lower than 8 wt % cannot be handled as a solid composition. On the other hand, the oil-wet hollow resin particles containing the hollow resin particles in an amount higher than 70 wt % can contain the liquid organic compounds non-uniformly distributed in the particles and cause problems in handling. The lower limit of the amount of the hollow resin particles preferably is 10 wt %, more preferably 13 wt % and further more preferably 15 wt %. The upper limit of the amount of the hollow resin particles is preferably 65 wt %, more preferably 63 wt % and further more preferably 60 wt %.

The amount of the liquid organic substance in the oil-wet hollow resin particles preferably ranges from 30 to 92 wt % and more preferably from 35 to 85 wt %.

The true specific gravity of the oil-wet hollow resin particles is not specifically restricted and preferably ranges from 0.02 to 0.4. Oil-wet hollow resin particles having a true specific gravity lower than 0.02 can have thin shell which leads to poor pressure resistance of the particles. On the other hand, oil-wet hollow resin particles having a true specific gravity higher than 0.4 can fail to attain a sufficient lightweight effect.

The lower limit of the true specific gravity of the oil-wet hollow resin particles is preferably 0.025 and more preferably 0.03, and the upper limit of the true specific gravity is preferably 0.3 and more preferably 0.2.

The wet-powdery hollow resin particles comprising the hollow resin particles and water (hereinafter referred to as water-wet hollow resin particles) of the present invention is a composition substantially containing the hollow resin particles and water in which the water content is at least 10 wt %.

The amount of the hollow resin particles in the water-wet hollow resin particles preferably ranges from 10 to 60 wt %. Water-wet hollow resin particles containing the hollow resin particles in an amount lower than 10 wt % cannot be handled as a solid composition. On the other hand, the water-wet hollow resin particles containing the hollow resin particles in an amount higher than 60 wt % can contain water non-uniformly distributed in the particles and cause problems in handling. The lower limit of the amount of the hollow resin particles is preferably 12 wt %, more preferably 15 wt % and further more preferably 18 wt %. The upper limit of the amount of the hollow resin particles is preferably 50 wt %, more preferably 40 wt % and further more preferably 30 wt %.

The hollow resin particles, fine-particle-coated hollow resin particles and wet-powdery hollow resin particles of the invention have a high pressure resistance and remain as closed pores without rupture in a composition which is extruded under high pressure by a coating machine such as an airless pump, a gear pump or a booster pump and receives high pressure during transfer between tanks in a manufacturing process or a high pressure in tanks for a long period of time. Owing to such high pressure resistance, the particles can attain their lightweight effect to reduce the weight of compositions and resultant formed products.

Process for Manufacturing Hollow Resin Particles

The process for manufacturing the hollow resin particles includes the step 1 in which heat-expandable microspheres are produced by dispersing an oily mixture of a polymerizable component and blowing agent in an aqueous dispersion medium and by polymerizing the polymerizable component (hereinafter referred to as the polymerization step), and the step 2 in which the heat-expandable microspheres produced in the step 1 are thermally expanded (hereinafter referred to as the expansion step).

Polymerization Step

In the polymerization step, heat-expandable microspheres are produced by dispersing an oily mixture of a polymerizable component and blowing agent in an aqueous dispersion medium and polymerizing the polymerizable component.

The polymerizable component contains 0.6 to 3.0 wt % of a crosslinkable monomer and 97.0 to 99.4 wt % of an uncrosslinkable monomer. The amount of the blowing agent ranges from 4 to 15 parts by weight to 100 parts by weight of the polymerizable component, and the blowing agent contains 50 to 100 wt % of an organic compound having a vapor pressure higher than 100 kPa at 25° C. The polymerizable component, crosslinkable monomer, uncrosslinkable monomer, blowing agent and organic compound having a vapor pressure higher than 100 kPa at 25° C. are those described above.

The polymerizable component is preferably polymerized in the presence of a polymerization initiator. The polymerization initiator can be contained in the oily mixture along with the polymerizable component and blowing agent.

The polymerization initiator is not specifically restricted, and includes, for example, peroxides, such as peroxydicarbonates, peroxyesters and diacyl peroxides; and azo compounds, such as azo nitriles, azo esters, azo amides, azo alkyls and polymeric azo initiators. One of or a combination of at least two of the polymerization initiators can be employed. The polymerization initiator is preferably an oil-soluble polymerization initiator which is soluble in the polymerizable component.

The amount of the polymerization initiator is not specifically restricted, and preferably ranges from 0.05 to 10 parts by weight to 100 parts by weight of the polymerizable component, more preferably from 0.1 to 8 parts by weight and further more preferably from 0.2 to 5 parts by weight.

The aqueous dispersion medium contains water, such as deionized water, as the main component, and the oily mixture is dispersed therein. The aqueous dispersion medium can further contain alcohols, such as methanol, ethanol and propanol, and hydrophilic organic solvents, such as acetone. The hydrophilic property as used herein means a property of a substance optionally miscible in water. The amount of the aqueous dispersion medium used in the step is not specifically restricted, and preferably ranges from 100 to 1000 parts by weight to 100 parts by weight of the polymerizable component.

The aqueous dispersion medium can further contain an electrolyte, such as sodium chloride, magnesium chloride, calcium chloride, sodium sulfate, magnesium sulfate, ammonium sulfate, and sodium carbonate. One of or a combination of at least two of these electrolyte can be used. The amount of the electrolyte is not specifically restricted, and preferably ranges from 0.1 to 50 parts by weight to 100 parts by weight of the aqueous dispersion medium.

The aqueous dispersion medium can contain at least one water-soluble compound selected from the group consisting of potassium dichromate, alkali metal nitrite salts, metal (III) halides, boric acid, water-soluble ascorbic acids, water-soluble polyphenols, water-soluble vitamin Bs, water-soluble phosphonic acids and phosphonate salts, polyalkylene imines having a nitrogen atom bonded with an alkyl group substituted with a hydrophilic functional group selected from the group consisting of carboxylic acid (salt) groups and phosphonic acid (salt) groups, and water-soluble 1,1-substitution compounds having a carbon atom bonded with a hetero atom and with a hydrophilic functional group selected from the group consisting of hydroxyl group, carboxylic acid (salt) groups and phosphonic acid (salt) groups. The term "water-soluble" in the present invention means that at least 1 g of a substance is soluble in 100 g of water.

The amount of the water-soluble compound contained in the aqueous dispersion medium is not specifically restricted, and preferably ranges from 0.0001 to 1.0 part by weight to 100 parts by weight of the polymerizable component, more preferably from 0.0003 to 0.1 parts by weight, and most preferably from 0.001 to 0.05 parts by weight.

The aqueous dispersion medium can contain a dispersion stabilizer or dispersion stabilizing auxiliary in addition to the electrolytes and water-soluble compounds.

The dispersion stabilizer is not specifically restricted, and includes, for example, calcium triphosphate; magnesium pyrophosphate and calcium pyrophosphate produced by double reaction; colloidal silica; alumina sol; and magnesium hydroxide. One of or a combination of at least two of the dispersion stabilizers can be used.

The amount of the dispersion stabilizer preferably ranges from 0.05 to 100 parts by weight to 100 parts by weight of the polymerizable component, and more preferably from 0.2 to 70 parts by weight.

The dispersion stabilizing auxiliary is not specifically restricted, and includes, for example, polymeric dispersion stabilizing auxiliaries; and surfactants, such as cationic surfactants, anionic surfactants, amphoteric surfactants and nonionic surfactants. One of or a combination of at least two of these dispersion stabilizing auxiliaries can be used.

The aqueous dispersion medium is prepared by optionally blending an electrolyte, water-soluble compound, dispersion stabilizer and dispersion stabilizing auxiliary with water (deionized water). The pH of the aqueous dispersion medium during polymerization is adjusted depending on the variants of the water-soluble compound, dispersion stabilizer, and dispersion stabilizing auxiliary.

The polymerization can be carried out in the presence of sodium hydroxide or a combination of sodium hydroxide and zinc chloride.

In the polymerization step, the oily mixture is dispersed and suspended in the aqueous dispersion medium to be formed into oil globules of a prescribed particle size.

The methods for dispersing and suspending the oily mixture include generally known dispersion techniques, such as agitation with a homo-mixer (for example, a device manufactured by PRIMIX Corporation), dispersion with a static dispersing apparatus such as a static mixer (for example, a device manufactured by Noritake Engineering Co., Ltd.), membrane suspension technique, and ultrasonic dispersion.

The suspension polymerization is then started by heating the dispersion in which the oily mixture is dispersed into oil globules in the aqueous dispersion medium. During the polymerization reaction, the dispersion is preferably agitated gently to prevent the floating of monomers and sedimentation of polymerized heat-expandable microspheres The polymerization temperature can be set optionally depending on the variant of the polymerization initiator, and is preferably adjusted within the range from 30 to 100° C., and more preferably from 40 to 90° C. The polymerization temperature is preferably maintained for about 1 to 20 hours. The initial pressure for the polymerization is not specifically restricted, and is preferably controlled within the range from 0 to 5 MPa in gauge pressure, and more preferably from 0.2 to 3 MPa.

The resultant slurry is filtered with a centrifugal separator, press filter or suction extractor to be processed into a cake with a water content ranging from 10 to 50 wt %, preferably from 15 to 45 wt % and more preferably from 20 to 40 wt %. The cake is dried in a tray drier, indirect heating oven, fluidized bed dryer, vacuum dryer, vibration dryer or flash dryer to be processed into dry powder with a moisture content not greater than 5 wt %, preferably not greater than 3 wt % and more preferably not greater than 1 wt %.

The cake can be washed with water and/or redispersed in water and then filtered again before the drying step for the purpose of decreasing the content of the ionic substances. The slurry can also be dried with a spray dryer or fluidized bed dryer to be processed into dry powder.

As described above, heat-expandable microspheres comprising a thermoplastic resin shell and a thermally-vaporizable blowing agent encapsulated therein are produced.

The mean particle size of the heat-expandable microspheres produced in the polymerization step is not specifically restricted, and preferably ranges from 1 to 60 µm, more preferably from 10 to 50 µm, further more preferably from 15 to 40 µm, yet further more preferably from 20 to 38 µm and most preferably from 25 to 35 µm.

The true specific gravity of the heat-expandable microspheres produced in the polymerization step preferably ranges from 1.02 to 1.30 and more preferably from 1.05 to 1.20. Heat-expandable microspheres having a true specific gravity within the range are preferable for manufacturing hollow resin particles having a high pressure resistance. Heat-expandable microspheres having a true specific gravity lower than 1.02 can have an extremely thin shell or weak shell with insufficient strength and denseness. A low true specific gravity indicates that the heat-expandable microspheres are only slightly expanded by the thermal load in the polymerization or drying step. Consequently, the resulting heat-expandable microspheres are apt to be processed into hollow resin particles having poor pressure resistance.

Expansion Step

The expansion step means the step in which the heat-expandable microspheres produced in the polymerization step are thermally expanded. The method for the expansion is not specifically restricted so far as the heat-expandable microspheres can be thermally expanded, and either dry thermal expansion or wet thermal expansion can be employed.

An example of the dry thermal expansion is the process disclosed in U.S. Patent Application Publication 2007/0154711 (Japanese Patent Application Publication 2006-213930) incorporated herein by reference, in particular the internal injection process. Another example of the dry thermal expansion is the process disclosed in Japanese Patent Application Publication 2006-96963 incorporated herein by reference. An example of the wet thermal expansion is the process disclosed in Japanese Patent Application Publication 1987-201231 incorporated herein by reference.

The preferable temperature for thermally expanding the heat-expandable microspheres ranges from 60 to 450° C.

Process for Manufacturing Fine-Particle-Coated Hollow Resin Particles

A preferable process for manufacturing the fine-particle-coated hollow resin particles includes a step in which the heat-expandable microspheres and fine particles are mixed (mixing step), and a step in which the mixture from the mixing step is heated to expand the heat-expandable microspheres and coat the outer surface of the resultant hollow resin particles with the fine particle (coating step).

Mixing Step

The heat-expandable microspheres and fine particle are mixed in the mixing step. The heat-expandable microspheres and fine particle are those described above.

The amount of the fine particle in the total of the heat-expandable microspheres and fine particle is not specifically restricted, and is preferably lower than 95 wt %, more preferably lower than 90 wt %, further more preferably lower than 85 wt % and most preferably lower than 80 wt %. An amount of the fine particle higher than 95 wt % can cause an excessively high true specific gravity of the resultant fine-particle-coated hollow resin particles to reduce the lightweight effect of the particles.

The device used to mix the heat-expandable microspheres and fine particles in the mixing step is not specifically restricted, and a quite simple device, such as a combination of a vessel and stirring paddle, can be used. A common type of powder mixer which shakes and agitates powder materials can be used. Such powder mixers include a ribbon mixer and vertical screw mixer which can shake and agitate or agitate powder materials. Recently available are high-efficiency multifunctional powder mixers manufactured by combining a plurality of agitation devices, such as Super Mixer (manufactured by KAWATA MFG Co., Ltd.), High Speed Mixer (manufactured by Fukae Co., Ltd.), New-Gra Machine (manufactured by Seishin Enterprise Co., Ltd.) and SV Mixer (manufactured by Kobelco Eco-Solutions Co., Ltd.) can also be employed.

Coating Step

In the coating step, the mixture of the heat-expandable microspheres and fine particles prepared in the mixing step is heated at a temperature higher than the softening point of the thermoplastic resin constituting the shell of the microspheres, and the heat-expandable microspheres are expanded and simultaneously coated with the fine particle on the outer surface of their shell.

The heat-expandable microspheres can be heated by a commonly used mixer dryer with a contact heating system or direct heating system. The function of the mixer dryer is not specifically restricted, and the mixer dryer preferably has the function of dispersing and mixing powder material under a controlled temperature, and optionally have a decompression device for accelerating the drying operation or a cooling device. The heating device is not specifically restricted, and includes, for example, Loedige Mixer (manufactured by Matsubo Corporation) and Solidaire (manufactured by Hosokawa Micron Corporation).

The heating temperature should be fixed at the optimum expansion temperature for the heat-expandable microspheres to be heated, and the temperature preferably ranges from 60 to 250° C., more preferably from 70 to 230° C. and further more preferably from 80 to 220° C.

Manufacturing Process for Wet-Powdery Hollow Resin Particles

The manufacturing process for water-wet hollow resin particles is not specifically restricted, and includes wet thermal expansion followed by adjustment of the moisture content of the resultant hollow resin particles, dry thermal expansion followed by moisturizing the resultant hollow resin particles with water, and thermal expansion of heat-expandable microspheres which are dispersed in water to form a slurry followed by adjustment of the moisture content of the resultant hollow resin particles.

The manufacturing process for the oil-wet hollow resin particles is not specifically restricted, and includes, for example, shaking and agitating hollow resin particles and a liquid organic compound to wet the particles, heating a dispersion in which heat-expandable microspheres are dispersed in a liquid organic compound, and the contacting heat-expandable microspheres with a heated liquid organic compound.

Compositions and Formed Products

The composition of the present invention contains a base component and at least one selected from the group consisting of the hollow resin particles, the fine-particle-coated hollow resin particles and the wet-powdery hollow resin particles described above.

The base component is not specifically restricted, and includes, for example, rubbers, such as natural rubbers, butyl rubber, silicone rubber and ethylene-propylene-diene rubber (EPDM); thermosetting resins, such as unsaturated polyester resins, epoxy resins and phenolic resins; waxes, such as polyethylene waxes and paraffin waxes; thermoplastic resins, such as ethylene-vinyl acetate copolymer (EVA), ionomers, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resin (nylon 6, nylon 66 etc.), polycarbonate, polyethylene terephthalate (PET), polybutylene terephthalate (PBT), polyacetal (POM) and polyphenylene sulfide (PPS); thermoplastic elastomers, such as olefin elastomers and styrene elastomers; bioplastics, such as polylactic acid (PLA), cellulose acetate, PBS, PHA and starch resins; sealing materials, such as silicones, modified silicones, polysulfides, modified polysulfides, urethanes, acrylates, polyisobutylenes and butyl rubbers; paint components, such as urethane polymers, ethylene-vinyl acetate copolymers, vinyl chloride polymers and acrylate polymers; and inorganic materials, such as cement, mortar and cordierite. One of or a combination of at least two of the above base components can be used.

The composition of the present invention can contain other components optionally selected according to the intended application in addition to the hollow resin particles and base component.

The composition of the present invention is prepared by mixing at least one selected from hollow resin particles, fine-particle-coated hollow resin particles and wet-powdery hollow resin particles, a base component and optionally other components. The methods for mixing these components is not specifically restricted and known conventional methods can be employed. The methods include, for example, mechanical mixing and homogenization by a Henschel mixer, tumbler mixer, planetary mixer or kneader.

The composition of the present invention includes, for example, rubber compositions, molding compositions, paint compositions, clay compositions, adhesive compositions and powder compositions.

The hollow resin particles of the present invention have a high pressure resistance as described above, and are expected to be used in applications where conventional hollow resin particles could not sufficiently function as a lightweight filler. Such applications include, for example, paint compositions and adhesive compositions.

In the manufacturing processes of paint or adhesive compositions, high compression stress and frictional force are generated in mixing the components, such as resins, pigments and additives. The resultant compositions are subjected to high pressure during pneumatic transportation through piping or application with a spray gun or airless spray. Thus a lightweight filler having insufficient pressure resistance can rupture in the above processes and cannot sufficiently reduce the specific gravity of the resultant products. Under such a situation, inorganic hollow particles having a high pressure resistance, such as glass balloons, shirasu balloons and carbon balloons, are preferably used to manufacture paint or adhesive compositions.

These inorganic hollow particles, however, have disadvantages including their high specific gravity which requires a high quantity of the inorganic hollow particles to be added to the compositions in order to sufficiently reduce the specific gravity of the resultant products; their hardness which impairs softness and other properties required for coating, and damages manufacturing facilities, such as hoses and nozzles; and their poor compatibility with resins, the major component of paints and adhesives, to result in detachment at the interface between the balloons and the resins when subjected to external stress to reduce the strength of the coating. At present, inorganic hollow particles are still employed in some applications despite such disadvantages. The hollow resin particles of the present invention are expected to replace the glass balloons and shirasu balloons in these applications.

Paint compositions usually contain resins as a major component, and optionally contain pigments, solvents, water and additives. The paint composition of the present invention is not specifically restricted if the composition contains at least one selected from the group consisting of the hollow resin particles, fine-particle-coated hollow resin particles and wet-powdery hollow resin particles described above in addition to the components usually contained in paint compositions. The form of the paint composition of the present invention is not specifically restricted and is preferably a plastisol containing a resin and plasticizer as major components.

The resins for the plastisol include vinyl chloride resin, acrylic resin, polyurethane resin, polyester resin, melamine resin and epoxy resin.

The plasticizer includes phthalic acid plasticizers, such as dioctyl phthalate, diisobutyl phthalate and diisononyl phthalate; and adipic acid plasticizers, such as dioctyl adipate.

The plastisol can contain the components other than the resins and plasticizers, such as fillers, colorants, high-boiling-point organic solvents to improve coating workability, and adhesives to improve adhesion of the coating. The fillers include calcium carbonate, talc, titanium oxide, zinc oxide, cray, kaolin, silica and alumina. The colorants include carbon black and titanium oxide. The adhesives include, for example, a mixture of at least one selected from the group consisting of polyamines, polyamides and polyols and a polyisocyanate prepolymer having a terminal NCO group blocked by a proper blocking agent, such as an oxime and lactam.

The amount of the components in the paint composition varies depending on the properties required to the paint composition.

The paint composition of the present invention is used, for example, for automotive coatings, aerospace coatings, train coatings, coatings for electronics appliance housing, architectural coatings, liner coatings and roofing material coatings. More preferable application of the paint composition of the present invention includes automotive undercoatings, automotive body sealants and damping paints.

The adhesive composition of the present invention contains an adhesive and at least one selected from the hollow resin particles, fine-particle-coated hollow resin particles and wet-powdery hollow resin particles described above.

The adhesive is not specifically restricted if it adheres objects, and include one-pack polyurethane adhesives, two-pack polyurethane adhesives, one-pack modified silicone adhesives, two-pack modified silicone adhesives, one-pack polysulfide adhesives, two-pack polysulfide adhesives and acrylate adhesives.

The formed product of the present invention is manufactured by forming the composition mentioned above. The formed product of the present invention includes, for example, coatings and molded products.

The formed product of the present invention has a lightweight property, porosity, sound absorbency, thermal insulation property, low thermal conductivity, permittivity-decreasing property, design potential, shock absorbing performance, strength and chipping resistance, which have been efficiently improved. In addition, the formed product of the present invention is expected to maintain a stable form against sink marks or distortion, minimize contraction and attain high dimensional stability.

EXAMPLES

The hollow resin particles, fine-particle-coated hollow resin particles and wet-powdery hollow resin particles of the present invention are described in greater detail in the following Examples. However, the present invention is not restricted within the scope of these Examples. In the following Examples and Comparative examples, "%" means "wt %" and "part(s)" means "part(s) by weight" unless otherwise specified.

The properties of the heat-expandable microspheres, hollow resin particles, fine-particle-coated hollow resin particles and wet-powdery hollow resin particles in the following Examples of production, Examples and Comparative Examples were measured, and the performance of these microspheres and particles was tested and evaluated using the procedures described below.

[Determination of Average Particle Size and Particle Size Distribution of Heat-Expandable Microspheres]

A Microtrac particle size analyzer (9320-HRA, manufactured by Nikkiso Co., Ltd.) was employed as the device for determining the D50 of the mean volume diameter, which is defined as the average particle size.

Mean Particle Size of Hollow Resin Particles

A sample of hollow resin particles was analyzed in a dry system of a laser diffraction particle size analyzer (MASTRSIZER 3000, manufactured by Malvern). The mean volume diameter $D_{50}$ determined in the analysis was defined as the mean particle size.

The mean particle size of the oil-wet hollow resin particles was determined after pretreatment in which the liquid organic compound wetting the hollow resin particles was flushed out in rinsing several times and dried. For flushing out mineral oil or diisononyl phthalate wetting the hollow resin particles, an organic solvent, such as alcohol, ether or hexane, was used. The organic solvent is selected from those which do not dissolve or swell the thermoplastic resin shell of the hollow resin particles.

The mean particle size of the water-wet hollow resin particles was determined after drying the particles.

True Specific Gravity ($d_1$) of Heat-Expandable Microspheres

The true specific gravity ($d_1$) of the heat-expandable microspheres was determined in the following procedure.

Specifically, the true specific gravity of the heat-expandable microspheres was determined by a liquid substitution method (Archimedean method) with isopropyl alcohol in an atmosphere at 25° C. and 50% RH (relative humidity) as described below.

At first, an empty 100-mL measuring flask was dried and weighed ($W_{S1}$ [g]). Then isopropyl alcohol was poured into the weighed measuring flask accurately to form a meniscus, and the measuring flask filled with isopropyl alcohol was weighed ($W_{B2}$ [g]).

The 100-mL measuring flask was then emptied, dried, and weighed ($W_{S1}$ [g]). About 50 mL of the heat-expandable microspheres with moisture content adjusted below 1% was placed in the weighed measuring flask, and the measuring flask containing the heat-expandable microspheres was weighed ($W_{s2}$ [g]). Then isopropyl alcohol was poured into the measuring flask containing the heat-expandable microspheres to form meniscus accurately without incorporating bubbles into the isopropyl alcohol, and the flask containing the heat-expandable microspheres and isopropyl alcohol was weighed ($W_{S3}$ [g]). The values, $W_{B1}$, $W_{B2}$, $W_{S1}$, $W_{S2}$, and $W_{S3}$, were introduced into the following formula to calculate the true specific gravity ($d_1$) of the heat-expandable microspheres.

$$d_1 = [(W_{S2}-W_{S1}) \times (W_{B2}-W_{B1})/100]/[(W_{B2}-W_{B1})-(W_{S3}-W_{S2})]$$

True Specific Gravity ($d_2$) of Hollow Resin Particles

The true specific gravity ($d_2$) of hollow resin particles was determined in the same manner as that in the determination of the true specific gravity ($d_1$) of the heat-expandable microspheres described above, except that hollow resin particles was used instead of the heat-expandable microspheres.

True Specific Gravity ($d_3$) of Hollow Resin Particles of Fine-Particle-Coated Hollow Resin Particles The true specific gravity ($d_3$) of the hollow resin particles of fine-particle-coated hollow resin particles was determined in the following procedure.

At first, the fine particle coating the hollow resin particles was flushed out in pretreatment. Specifically the fine-particle-coated hollow resin particles were mixed with water and, if necessary, with an acid or base, and the mixture was stirred to decompose or flush out the fine particle. Then the mixture was filtered to be separated into solid and liquid portions. The treatments were repeated several times until hollow resin particles without the fine particle were obtained. In the case that hollow resin particles are coated with calcium carbonate or magnesium hydroxide, the fine particle can be removed by washing with hydrochloric acid followed with rinsing in water several times to obtain hollow resin particles without the fine particles.

Then the resultant hollow resin particles were dried to adjust their moisture content below 1% (and the hollow resin particles were analyzed to confirm that the particles contain ash in an amount lower than 5 wt %). The true specific gravity ($d_3$) of the resultant hollow resin particles was determined in the same manner as that in the determination of the true specific gravity ($d_2$) of the hollow resin particles described above.

True Specific Gravity ($d_4$) of Hollow Resin Particles of Oil-Wet Hollow Resin Particles The true specific gravity ($d_4$) of the hollow resin particles of the oil-wet hollow resin particles was determined in the following procedure.

At first, the liquid organic compound wetting the hollow resin particles was flushed out with organic solvent several times in pretreatment. For flushing out mineral oil or diisononyl phthalate wetting the hollow resin particles, organic solvent, such as alcohol, ether and hexane, was used. The organic solvent is selected from those which do not dissolve or swell the thermoplastic resin shell of the hollow resin particles. The hollow resin particles without the liquid organic compound were thus obtained and analyzed by gas chromatography to confirm that the hollow resin particles contained the residue of the liquid organic compound in an amount lower than 0.5 wt %.

Then the resultant hollow resin particles were dried to adjust their moisture content below 1%. The true specific gravity ($d_4$) of the hollow resin particles was determined in the same manner as that in the determination of the true specific gravity ($d_2$) of the hollow resin particles described above.

True Specific Gravity ($d_5$) of Hollow Resin Particles of Water-Wet Hollow Resin Particles The true specific gravity ($d_5$) of the hollow resin particles of water-wet hollow resin particles was determined in the following procedure.

At first, the water-wet hollow resin particles were dried to adjust their moisture content below 1%. The true specific gravity ($d_5$) of the resultant hollow resin particles was determined in the same manner as that in the determination of the true specific gravity ($d_2$) of the hollow resin particles described above.

Moisture Content of Heat-Expandable Microspheres and Hollow Resin Particles

The moisture content of a sample of heat-expandable microspheres and hollow resin particles was determined with a Karl Fischer moisture meter (MKA-510N, manufactured by Kyoto Electronics Manufacturing Co., Ltd.). The moisture content (wt %) of the heat-expandable microspheres and hollow resin particles was respectively represented by $C_{w1}$ and $C_{w2}$.

$C_{w1}$: moisture content of heat-expandable microspheres
$C_{w2}$: moisture content of hollow resin particles Encapsulation Ratio of a Blowing Agent ($C_1$) in Heat-Expandable Microspheres 1.0 g of a sample of dried heat-expandable microspheres with moisture content adjusted from 0 to 2 wt % was placed in a stainless steel evaporating dish 15 mm deep and 80 mm in diameter, and weighed out ($W_1$ [g]). Then 30 mL of acetonitrile was added to disperse the microspheres uniformly. After being left for 24 hours at room temperature, the sample was dried under reduced pressure at 130° C. for 2 hours, and the dry weight ($W_2$ [g]) was determined. The encapsulation ratio of the blowing agent ($C_1$) in the heat-expandable microspheres was calculated by the following formula:

$$C_1(\text{wt \%}) = 100 \times \{100 \times (W_1-W_2)/1.0-C_{w1}\}/(100-C_{w1})$$

(where the moisture content of the heat-expandable microspheres, $C_{w1}$, was measured in the method mentioned above).

Encapsulation Ratio of a Blowing Agent ($C_2$) in Hollow Resin Particles $W_3$ g of a sample of hollow resin particles having a moisture content adjusted below 1 wt % was placed in a stainless steel evaporating dish 15 mm deep and 80 mm in diameter, and weighed out ($W_4$ [g]). $W_3$ g usually ranges from 0.2 to 0.5 g. Then 30 mL of acetonitrile was added to disperse the particles uniformly. After being left for 30 minutes at room temperature, the particles were dried at 130° C. for 2 hours, and the dry weight ($W_5$ [g]) was determined.

The encapsulation ratio of the blowing agent ($C_2$) in the hollow resin particles was calculated by the following formula:

$$C_2(\text{wt \%}) = 100 \times \{100 \times (W_4 - W_5)/W_3 - C_{w2}\}/(100 - C_{w2})$$

(where the moisture content of the hollow resin particles, $C_{w2}$, was measured in the method mentioned above).

Encapsulation Ratio of a Blowing Agent ($C_3$) in Hollow Resin Particles of Fine-Particle-Coated Hollow Resin Particles The encapsulation ratio of a blowing agent ($C_3$) in the hollow resin particles of fine-particle-coated hollow resin particles was determined in the following procedure.

At first, the fine particles coating the hollow resin particles were flushed out in pretreatment. Specifically the fine-particle-coated hollow resin particles were mixed with water and, if necessary, with an acid or base, and the mixture was stirred to decompose or flush out the fine particles. Then the mixture was filtered to be separated into solid and liquid portions. The treatments were repeated several times until hollow resin particles without the fine particles were obtained.

Then the resultant hollow resin particles were dried to adjust their moisture content below 1% (and the hollow resin particles were analyzed to confirm that the particles contain ash in an amount lower than 5 wt %). The encapsulation ratio of a blowing agent ($C_3$) in the hollow resin particles was determined in the same manner as that in the determination of the encapsulation ratio of a blowing agent ($C_2$) in the hollow resin particles described above.

Encapsulation Ratio of a Blowing Agent ($C_4$) in Hollow Resin Particles in Oil-Wet Hollow Resin Particles The encapsulation ratio of a blowing agent ($C_4$) in hollow resin particles in oil-wet hollow resin particles was determined in the following procedure.

At first, the liquid organic compound wetting the hollow resin particles was flushed out with organic solvent several times in pretreatment. For flushing out mineral oil or diisononyl phthalate wetting the hollow resin particles, an organic solvent, such as alcohol, ether and hexane, was used. The organic solvent is selected from those which do not dissolve or swell the thermoplastic resin shell of the hollow resin particles. The hollow resin particles without the liquid organic compound were thus obtained (and analyzed by gas chromatography to confirm that the hollow resin particles contained the residue of the liquid organic compound in an amount lower than 0.5 wt %.)

Then the resultant hollow resin particles were dried to adjust their moisture content below 1%. The encapsulation ratio of a blowing agent ($C_4$) in the hollow resin particles was determined in the same manner as that in the determination of the encapsulation ratio of a blowing agent ($C_2$) in the hollow resin particles described above.

Encapsulation Ratio of a Blowing Agent ($C_5$) in Hollow Resin Particles of Water-Wet Hollow Resin Particles The encapsulation ratio of a blowing agent ($C_5$) in hollow resin particles of water-wet hollow resin particles was determined in the following procedure.

At first, the water-wet hollow resin particles were dried to adjust their moisture content below 1%. The encapsulation ratio of a blowing agent ($C_5$) in the resultant hollow resin particles was determined in the same manner as that in the determination of the encapsulation ratio of a blowing agent ($C_2$) in the hollow resin particles described above.

Ash Content

A dried sample was placed in a crucible in an amount of $W_p$ g and heated with an electric heater at 700° C. for 30 min to be ignited into ash, and the weight of the resultant ash, $W_q$ (g), was measured. The ash content in the sample, $C_A$ (wt %), was calculated from $W_p$ (g) and $W_q$ (g) by the following formula.

$$C_A(\text{wt \%}) = (W_q/W_p) \times 100$$

The ash content of each sample of heat-expandable microspheres, hollow resin particles and fine-particle-coated hollow resin particles was determined. The samples having a moisture content of not higher than 1% were used for the determination.

Escape-Initiation Temperature ($T_R$) of a Blowing Agent from Hollow Resin Particles The determination was conducted with a thermogravimetric analyzer (TGA Q500, manufactured by TA Instruments). A sample ($W_9$ g) of hollow resin particles was placed in a 500-μL ceramic pan, and at first heated by elevating the temperature from 25 to 50° C. at the rate of 10° C./min. Then the sample was heated at 50° C. for 30 minutes to remove moisture to a constant weight, $W_0$ (g), measured at the same time. Then heating was started from 50° C. by elevating the temperature at the rate of 10° C./min to 350° C. The temperature at which the weight of the sample, $W_0$ (g), decreased by 0.5 wt % was defined as the escape-initiation temperature, $T_R$ (° C.), of the blowing agent.

For the determination with fine-particle-coated hollow resin particles, at first, the fine particles coating the hollow resin particles was flushed out in pretreatment. Specifically the fine-particle-coated hollow resin particles were mixed with water and, if necessary, with an acid or base, and the mixture was stirred to decompose or flush out the fine particles. Then the mixture was filtered to be separated into solid and liquid portions. The treatments were repeated several times until hollow resin particles without the fine particles were obtained.

Then the resultant hollow resin particles were dried to adjust their moisture content below 1% (and the hollow resin particles were analyzed to confirm that the particles contained ash in an amount lower than 5 wt %). The escape-initiation temperature of the blowing agent in the hollow resin particles was determined in the same manner as described above.

For the determination with oil-wet hollow resin particles, the liquid organic compound wetting the hollow resin particles was flushed out with organic solvent several times in pretreatment and the resultant hollow resin particles were dried. The resultant hollow resin particles were analyzed by gas chromatography to confirm that the hollow resin particles contained the residue of the liquid organic compound in an amount lower than 0.5 wt %. The escape-initiation temperature of the blowing agent in the resultant hollow resin particles was determined in the same manner as described above.

For the determination with water-wet hollow resin particles, the water-wet hollow resin particles were dried at a temperature below 40° C. to adjust their moisture content at 1% or lower, and the escape-initiation temperature of the blowing agent in the dried hollow resin particles was determined in the same manner as described above.

Determination of the Expansion-Initiation Temperature ($T_{s1}$) and the Maximum Expansion Temperature ($T_{max1}$)

The maximum expansion temperature was determined with a DMA (DMA Q800, Dynamic Mechanical Analyzer, manufactured by TA Instruments). In an aluminum cup of 4.8 mm deep and 6.0 mm in diameter (5.65 mm in inner diameter), 0.5 mg of a sample of heat-expandable microspheres was placed, and the cup was covered with an aluminum cap (5.6 mm in diameter and 0.1 mm thick) to prepare a test sample. The test sample was set on the device and subjected to a pressure of 0.01 N with the compression unit of the device, and the height of the sample was measured. The sample was then heated by elevating the temperature at the rate of 10° C./min from 20 to 300° C., being subjected to a pressure of 0.01 N with the compression unit, and the change in the height of the sample was measured. The temperature at which the height started to increase was determined as the expansion-initiation temperature ($T_{s1}$) of the heat-expandable microspheres and the temperature at which the compression unit indicated the highest position ($H_{max}$) was determined as the maximum expansion temperature ($T_{max1}$) of the heat-expandable microspheres.

Amount of an Organic Compound Having a Vapor Pressure Higher than 100 kPa at 25° C.

The amount of the organic compound having a vapor pressure higher than 100 kPa at 25° C. contained in the blowing agent was determined by headspace gas chromatography in the following procedure.

In a vial, 0.01 to 0.10 g of hollow resin particles was weighed, about 0.1 g of N,N-dimethylformamide was added and immediately the vial was sealed. The sealed vial was heated at 140° C. for 1 hour. Then the headspace of the vial was sampled by a gas-tight syringe and introduced into a gas chromatograph having a GC column (GC column:Rxi-624Sil MS, 30 m long, 0.32 mm in inner diameter, 1.8 μm film thickness, manufactured by Restek) to determine the amount of the organic compound having a vapor pressure higher than 100 kPa at 25° C. contained in the blowing agent. Normal hexane was used as the reference sample.

The amount of the organic compound having a vapor pressure higher than 100 kPa at 25° C. contained in the blowing agent in fine-particle-coated hollow resin particles and wet-powdery hollow resin particles was determined as follows.

For the determination with fine-particle-coated hollow resin particles, the fine-particle-coated hollow resin particles were mixed with water and, if necessary, with an acid or base, and the mixture was stirred to remove the fine particles from the hollow resin particles in pretreatment. Then, the resultant hollow resin particles were dried to adjust their moisture content below 1% (and the hollow resin particles were analyzed to confirm that the particles contained ash in an amount lower than 5 wt %). The resultant hollow resin particles were analyzed by headspace gas chromatography in the same manner as described above.

For the determination with oil-wet hollow resin particles, the liquid organic compound wetting the hollow resin particles was flushed out several times in pretreatment and the resultant hollow resin particles were dried. The resultant hollow resin particles were analyzed by headspace gas chromatography in the same manner as described above. Further, the chromatography simultaneously confirmed that the resultant hollow resin particles contained the residue of the liquid organic compound in an amount lower than 0.5 wt %.

For the determination with water-wet hollow resin particles, the water-wet hollow resin particles were dried at 40° C. or lower temperature to adjust their moisture content at 1% or lower, and the resultant hollow resin particles was analyzed by headspace gas chromatography in the same manner as described above.

Pressure Resistance

A vinyl chloride paste was prepared by blending 56 parts by weight of vinyl chloride resin, 92 parts by weight of diisononyl phthalate as a plasticizer and 52 parts by weight of calcium carbonate as a filler. The resultant vinyl chloride paste had a specific gravity of 1.3. A prescribed amount of each of hollow resin particles, fine-particle-coated hollow resin particles and oil-wet hollow resin particles was blended with the vinyl chloride paste and the bubbles in the blend were eliminated to prepare a vinyl chloride compound having a specific gravity of 1.0. The specific gravity, 1.0, of the vinyl chloride compound was confirmed by the determination according to JIS K-5600 (2014) with a specific gravity cup.

An acrylic paste was also prepared by blending 135 parts by weight of 50-% acrylic resin emulsion and 65 parts by weight of calcium carbonate as a filler. The resultant acrylic paste had a specific gravity of 1.3. A prescribed amount of water-wet hollow resin particles was blended with the acrylic paste and the bubbles in the blend were eliminated to prepare an acrylic compound having a specific gravity of 1.0. The specific gravity, 1.0, of the acrylic compound was confirmed by the determination according to JIS K-5600 (2014) with a specific gravity cup.

About 180 mL of each of the vinyl chloride and acrylic compounds prepared as described above was poured in a pressure-tight container and pressurized with a press under the respective conditions; (i) at 10 MPa for 1 hour, (ii) at 20 MPa for 1 hour, (iii) at 20 MPa for 24 hours, and (iv) at 30 MPa for 1 hour. After the pressurization, the foam in the compound was eliminated with a stirring defoamer, and the specific gravity of the compound was determined by using a 50-mL specific gravity cup to evaluate the pressure resistance of the hollow resin particles.

In addition, the compounds after the pressurization were observed through optical microscope to inspect the state of the hollow resin particles.

Production Example 1

An aqueous dispersion medium was prepared by dissolving 126 parts of sodium chloride in 500 parts of deionized water, adding 0.45 parts of polyvinyl pyrrolidone, 0.1 part of carboxymethylated polyethylene imine sodium salt and 60 parts of colloidal silica containing 20 wt % of silica and adjusting the pH at 2.8 to 3.2.

An oily mixture was prepared by mixing and dissolving 153 parts of acrylonitrile, 53 parts of methacrylonitrile, 14 parts of methyl methacrylate, 2 parts of diethylene glycol dimethacrylate, 1.3 parts of trimethylolpropane trimethacrylate, 3 parts of di(2-ethylhexyl) peroxydicarbonate and 29 parts of isobutane.

The aqueous dispersion medium and the oily mixture were mixed and agitated with a Homo-mixer (TK Homo-mixer, manufactured by Primix Corporation) at 10,000 rpm for 1 min to be prepared into a suspension. Then, the suspension was transferred into a compressive reactor of 1.5-liter capacity, purged with nitrogen with the initial reaction pressure of 0.35 MPa and polymerized at 60° C. for 20 hours with agitation at 80 rpm. The resultant polymerization product was filtered and dried to be prepared into heat-expandable microspheres 1. The properties of the resultant heat-expandable microspheres are shown in Table 1.

TABLE 1

| | | | | Production Examples | | | | | | | | |
|---|---|---|---|---|---|---|---|---|---|---|---|---|
| | | | | 1 Heat-expandable microspheres 1 | 2 Heat-expandable microspheres 2 | 3 Heat-expandable microspheres 3 | 4 Heat-expandable microspheres 4 | 5 Heat-expandable microspheres 5 | 6 Heat-expandable microspheres 6 | 7 Heat-expandable microspheres 7 | 8 Heat-expandable microspheres 8 | 9 Heat-expandable microspheres 9 |
| Aqueous dispersion (parts by weight) | Oily mixture | Uncross-linkable monomer | Acrylonitrile | 153 | 146 | 158 | 146 | 149 | 148 | 140 | 148 | 144 |
| | | | Methacrylonitrile | 53 | 60 | 58 | 60 | 67 | 32 | 47 | 58 | 40 |
| | | | Methyl methacrylate | 14 | 10 | 10 | | 4 | 30 | | 14 | |
| | | | Isobornyl methacrylate | | | | 14 | | 4 | 33 | | 30 |
| | | | Methacrylic acid | | 4 | 4 | | | 6 | | | 6 |
| | | Bifunctional cross-linkable monomer | Ethylene glycol dimethacrylate | | | | | | | 1.45 | | |
| | | | Diethylene glycol dimethacrylate | 2 | | | | | 1.7 | | | 1 |
| | | | Polyethylene glycol (200) dimethacrylate | | | 2 | | | | | | |
| | | | Polyethylene glycol (400) diacrylate | | | | | | | | 2.2 | 4 |
| | | | Ethoxylated bisphenol A dimethacrylate (EO 2.6 mol) | | 1.8 | | | | | | | |
| | | | Ethoxylated bisphenol A dimethacrylate (EO 10 mol) | | | | | 2.1 | | | | |
| | | Trifunctional cross-linkable monomer | Trimethylol propane trimethacrylate | 1.3 | | 2.6 | | | | | | |
| | | | Triallyl isocyanurate | | | | | 1.6 | | 1.2 | | |
| | | Polymerization initiator | Di (2-ethylhexyl) peroxydicarbonate | 3 | | | | | | | | |
| | | | Dilauroyl peroxide | | 3 | | | 2.5 | | 2.5 | | 2.5 |
| | | | t-hexyl peroxypivalate | | | | | | | 2 | | |
| | | | di(3,5,5-trimethyl-hexanoyl) peroxide | | | | | 2.5 | | 2 | | |
| | | | 2,2'-azobis(2,4-dimethyl-valeronitrile) | | | 3 | | | | | 3 | |
| | | | 2,2'-azobis (2-methyl-butylonitrile) | | | | | | | | 3 | |
| | | | 2,2'-azobisiso-butylonitrile | | | | | | | | | |
| | | Blowing agent | Propane | | | | 3 | | | | | 10 |
| | | | Isobutane | 29 | 33 | 22 | 21 | 14 | 30 | 33 | 25 | 15 |
| | | | Isopentane | | | | 2 | | | | 4 | 5 |
| | Aqueous dispersion | Deionized water | | 500 | 500 | 500 | 500 | 500 | 500 | 500 | 500 | 500 |
| | | Electrolyte | Sodium chloride | 126 | 126 | 126 | 126 | 126 | 126 | 126 | 126 | 126 |

TABLE 1-continued

|  |  |  | Production Examples |  |  |  |  |  |  |  |  |
|---|---|---|---|---|---|---|---|---|---|---|---|
|  |  |  | 1 Heat-expand-able micro-spheres 1 | 2 Heat-expand-able micro-spheres 2 | 3 Heat-expand-able micro-spheres 3 | 4 Heat-expand-able micro-spheres 4 | 5 Heat-expand-able micro-spheres 5 | 6 Heat-expand-able micro-spheres 6 | 7 Heat-expand-able micro-spheres 7 | 8 Heat-expand-able micro-spheres 8 | 9 Heat-expand-able micro-spheres 9 |
|  | medium | Stabi-lization auxiliary | Polyvinyl pyrrolidone | 0.45 | 0.35 | 0.4 | 0.4 | 0.3 | 0.25 | 0.4 | 0.3 | 0.3 |
|  |  | Stabilizer | Colloidal silica | 60 | 75 | 85 | 90 | 88 | 68 | 87 | 73 | 55 |
|  |  | Water-soluble com-pound | Aluminum chloride |  |  |  |  | 0.5 |  |  |  |  |
|  |  |  | Carboxy-methylated polyethylene imine sodium salt | 0.1 | 0.1 | 0.1 | 0.1 |  | 0.1 | 0.2 | 0.15 | 0.15 |
|  | pH |  |  | 3 | 3 | 3 | 3 | 3 | 3 | 3 | 3 | 3 |
| Perform-ance of heat-expand-able micro-spheres | Mean volume diameter ($D_{50}$) |  |  | 42 | 33 | 24 | 14 | 17 | 35 | 20 | 22 | 50 |
|  | True specific gravity |  |  | 1.07 | 1.05 | 1.12 | 1.12 | 1.14 | 1.09 | 1.05 | 1.05 | 1.06 |
|  | Encapsulation ratio of blowing agent (%) |  |  | 10.2 | 12.2 | 8.5 | 8.3 | 5.2 | 10.2 | 11.2 | 9.9 | 10 |
|  | Expansion performance | Expansion initiation temp. (° C.) |  | 115 | 122 | 114 | 123 | 122 | 120 | 119 | 122 | 107 |
|  |  | Maximum expansion temp. (° C.) |  | 158 | 146 | 150 | 164 | 159 | 164 | 162 | 168 | 146 |
|  |  | Maximum height (μm) |  | 440 | 260 | 214 | 447 | 189 | 416 | 725 | 942 | 257 |

Production Examples 2 to 9, Comparative Production Examples 10 to 15 and 24, and Production Examples 16 to 23

In Examples of production 2 to 9, Comparative Production Examples 10 to 15 and 24 and Production Examples 16 to 23, the heat expandable microspheres 2 to 24 were produced in the same manner as Production Example 1, except that the reaction conditions were changed according to those shown in Tables 1 to 3. The properties of the heat-expandable microspheres were evaluated and shown in Tables 1 to 3.

TABLE 2

|  |  |  |  | Comparative Production Examples |  |  |  |  |  |  |
|---|---|---|---|---|---|---|---|---|---|---|
|  |  |  |  | 10 Heat-expand-able micro-spheres 10 | 11 Heat-expand-able micro-spheres 11 | 12 Heat-expand-able micro-spheres 12 | 13 Heat-expand-able micro-spheres 13 | 14 Heat-expand-able micro-spheres 14 | 15 Heat-expand-able micro-spheres 15 | 24 Heat-expand-able micro-spheres 24 |
| Aqueous dis-persion (parts by weight) | Oily mixture | Uncross-linkable monomer | Acrylonitrile | 146 | 146 | 154 | 146 | 146 | 166 | 120 |
|  |  |  | Meth-acrylonitrile | 60 | 60 | 66 | 60 | 60 | 41 | 98 |
|  |  |  | Methyl methacrylate | 14 | 14 |  | 14 | 10 |  | 2.8 |
|  |  |  | Isobornyl methacrylate |  |  |  |  |  | 3 |  |
|  |  |  | Methacrylic acid |  |  |  |  | 4 | 10 |  |
|  |  | Bifunc-tional cross-linkable monomer | Ethylene glycol dimethacrylate | 6.9 |  | 3.5 |  |  | 1.7 | 0.9 |
|  |  |  | Diethylene glycol dimethacrylate |  |  |  |  |  |  |  |
|  |  |  | Polyethylene glycol (200) dimethacrylate |  |  |  |  |  |  |  |
|  |  |  | Polyethylene glycol (400) diacrylate |  |  |  |  |  |  |  |

TABLE 2-continued

| | | | Comparative Production Examples | | | | | | |
|---|---|---|---|---|---|---|---|---|---|
| | | | 10 Heat-expandable microspheres 10 | 11 Heat-expandable microspheres 11 | 12 Heat-expandable microspheres 12 | 13 Heat-expandable microspheres 13 | 14 Heat-expandable microspheres 14 | 15 Heat-expandable microspheres 15 | 24 Heat-expandable microspheres 24 |
| | | Ethoxylated bisphenol A dimethacrylate (EO 2.6 mol) | | 1.1 | | 2.2 | | | |
| | | Ethoxylated bisphenol A dimethacrylate (EO 10 mol) | | | | | | | |
| | Trifunctional cross-linkable monomer | Trimethylol propane trimethacrylate | | | | | 2.6 | | |
| | | Triallyl isocyanurate | | | | | | | |
| | Polymerization initiator | Di (2-ethylhexyl) peroxydicarbonate | 3 | 3 | 3 | 3 | 3 | | |
| | | Dilauroyl peroxide | 2 | 2 | | 2 | 2 | | |
| | | t-hexyl peroxypivalate | | | | | | | |
| | | di(3,5,5-trimethyl-hexanoyl) peroxide | | | | | | 2.5 | |
| | | 2,2'-azobis(2,4-dimethyl-valeronitrile) | | | | | | 1 | |
| | | 2,2'-azobis (2-methyl-butylonitrile) | | | | | | 1 | 0.9 |
| | | 2,2'-azobisiso-butylonitrile | | | | 2 | | | |
| | Blowing agent | Propane | | | | | | | |
| | | Isobutane | 29 | 29 | 49 | | 5.5 | 20 | |
| | | Isopentane | | | | 29 | | 40 | 46 |
| Aqueous dispersion medium | Deionized water | | 500 | 500 | 500 | 500 | 500 | 500 | 500 |
| | Electrolyte | Sodium chloride | 126 | 126 | 126 | 126 | 126 | 126 | 110 |
| | Stabilization auxiliary | Polyvinyl pyrrolidone | 0.9 | 0.25 | 0.25 | 0.25 | 1.5 | 0.3 | 0.9 |
| | Stabilizer | Colloidal silica | 64 | 73 | 73 | 82 | 75 | 65 | 92 |
| | Water-soluble compound | Aluminum chloride | 0.2 | | | | 0.2 | | |
| | | Carboxy-methylated polyethylene imine sodium salt | | 0.1 | 0.2 | 0.1 | | 0.2 | 0.9 |
| | pH | | 3 | 3 | 3 | 3 | 3 | 3 | 3 |
| Performance of heat-expandable microspheres | Mean volume diameter ($D_{50}$) | | 36 | 32 | 30 | 25 | 18 | 32 | 14 |
| | True specific gravity | | 1.07 | 1.08 | 0.97 | 0.98 | 1.24 | 0.97 | 0.97 |
| | Encapsulation ratio of blowing agent (%) | | 9.7 | 9.6 | 16 | 10.3 | 2 | 18.5 | 16.5 |
| | Expansion performance | Expansion initiation temp. (° C.) | 123 | 111 | 107 | 127 | 113 | 114 | 110 |
| | | Maximum expansion temp. (° C.) | 132 | 162 | 168 | 167 | 116 | 163 | 155 |
| | | Maximum height (μm) | 97 | 1228 | 742 | 453 | 10 | 2520 | 2780 |

TABLE 3

| | | | | Production Examples | | | | | | | |
|---|---|---|---|---|---|---|---|---|---|---|---|
| | | | | 16 Heat-expandable microspheres 16 | 17 Heat-expandable microspheres 17 | 18 Heat-expandable microspheres 18 | 19 Heat-expandable microspheres 19 | 20 Heat-expandable microspheres 20 | 21 Heat-expandable microspheres 21 | 22 Heat-expandable microspheres 22 | 23 Heat-expandable microspheres 23 |
| Aqueous dispersion (parts by weight) | Oily mixture | Uncrosslinkable monomer | Acrylonitrile | 198 | 191 | 189 | 189 | 154 | 131 | 158 | 160 |
| | | | Methacrylonitrile | | 5 | | 10 | | 56 | 18 | |
| | | | Methyl methacrylate | 16 | 24 | 31 | 21 | 61 | | | |
| | | | Isobornyl methacrylate | | | | | | | | |
| | | | Methacrylic acid | | | | | 5 | 33 | 44 | 53 |
| | | Bifunctional crosslinkable monomer | Ethylene glycol dimethacrylate | 1.8 | | 0.5 | | | | | |
| | | | Diethylene glycol dimethacrylate | | 2.2 | | | | 2.0 | 1.4 | 2.0 |
| | | | Polyethylene glycol (200) dimethacrylate | | | 1.5 | | | | 0.8 | |
| | | | Polyethylene glycol (400) diacrylate | | | | | | | | |
| | | | Ethoxylated bisphenol A dimethacrylate (EO 2.6 mol) | | | | | 2.2 | | | |
| | | | Ethoxylated bisphenol A dimethacrylate (EO 10 mol) | | | | | 2 | | | |
| | | Trifunctional crosslinkable monomer | Trimethylol propane trimethacrylate | | | | 1 | | | | |
| | | | Triallyl isocyanurate | | | 0.8 | | | | | 0.6 |
| | | Polymerization initiator | Di (2-ethylhexyl) peroxydicarbonate | 1 | 1 | 1 | 1 | 1 | 1.0 | 1.0 | 1.0 |
| | | | Dilauroyl peroxide | | | | | | | | |
| | | | t-hexyl peroxypivalate | | | | | | | | |
| | | | di(3,5,5-trimethyl-hexanoyl) peroxide | 2 | 2 | 2 | 2 | 2 | 2.0 | 2.0 | 2.0 |
| | | | 2,2'-azobis(2,4-dimethyl-valeronitrile) | | | | | | | | |
| | | | 2,2'-azobis(2-methyl-butylonitrile) | | | | | | | | |
| | | | 2,2'-azobisisobutylonitrile | | | | | | | | |
| | | Blowing agent | Propane | | | | | | | | |
| | | | Isobutane | 32 | 24 | 30 | 26 | 22 | 30 | 30 | 32 |
| | | | Isopentane | | | | | | | | |
| | Aqueous dispersion medium | Deionized water | | 500 | 500 | 500 | 500 | 500 | 500 | 500 | 500 |
| | | Electrolyte | Sodium chloride | 126 | 126 | 126 | 126 | 126 | 126 | 126 | 126 |
| | | Stabilization auxiliary | Polyvinyl pyrrolidone | 0.9 | 0.9 | 0.9 | 0.9 | 0.9 | 0.6 | 0.6 | 0.6 |
| | | Stabilizer | Colloidal silica | 65 | 80 | 70 | 63 | 75 | 55 | 55 | 45 |
| | | Water-soluble compound | Aluminum chloride | | | | | | | | |
| | | | Carboxymethylated polyethylene | 0.3 | 0.4 | 0.4 | 0.4 | 0.4 | 0.4 | 0.4 | 0.4 |

TABLE 3-continued

| | | | Production Examples | | | | | | | |
|---|---|---|---|---|---|---|---|---|---|---|
| | | | 16 Heat-expand-able micro-spheres 16 | 17 Heat-expand-able micro-spheres 17 | 18 Heat-expand-able micro-spheres 18 | 19 Heat-expand-able micro-spheres 19 | 20 Heat-expand-able micro-spheres 20 | 21 Heat-expand-able micro-spheres 21 | 22 Heat-expand-able micro-spheres 22 | 23 Heat-expand-able micro-spheres 23 |
| | | imine sodium salt | | | | | | | | |
| | pH | | 3 | 3 | 3 | 3 | 3 | 3 | 3 | 3 |
| Perform-ance of heat-expand-able micro-spheres | Mean volume diameter ($D_{50}$) | | 30 | 16 | 25 | 35 | 20 | 21 | 17 | 35 |
| | True specific gravity | | 1.08 | 1.09 | 1.1 | 1.11 | 1.08 | 1.07 | 1.07 | 1.05 |
| | Encapsulation ratio of blowing agent (%) | | 11.1 | 8.6 | 10.7 | 9.6 | 7.5 | 10.9 | 11 | 10.7 |
| | Expansion performance | Expansion initiation temp. (° C.) | 115 | 110 | 111 | 112 | 114 | 147 | 160 | 163 |
| | | Maximum expansion temp. (° C.) | 143 | 142 | 144 | 145 | 146 | 170 | 185 | 195 |
| | | Maximum height (μm) | 100 | 80 | 70 | 220 | 300 | 650 | 480 | 520 |

Examples 1 to 4 and 14 to 16 and Comparative Examples 1, 6 and 7

In Examples 1 to 4 and 14 to 16 and Comparative Examples 1, 6 and 7, the heat expandable microspheres shown in Tables 4 to 6 were thermally expanded into the hollow resin particles by dry thermal expansion.

The dry thermal expansion was conducted by the internal injection process disclosed in U.S. Patent Application Publication 2007/0154711 (Japanese Patent Application Publication 2006-213930) incorporated herein by reference. Specifically, the heat-expandable microspheres were manufactured into hollow resin particles by thermal expansion with a manufacturing device having the expansion unit shown in FIG. 3 in the procedure described below.

Expansion Unit of the Manufacturing Device

Figure 3:
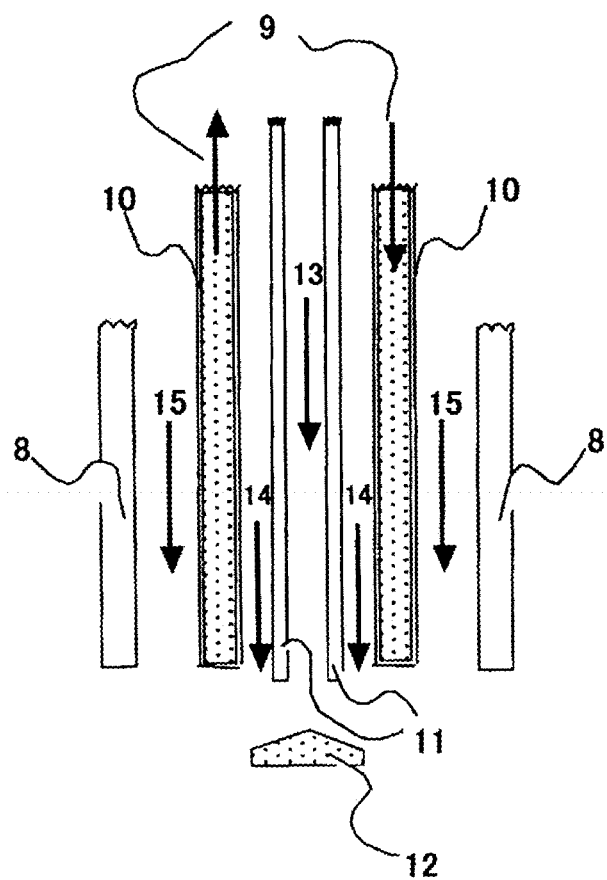
FIG. 3 is a schematic diagram of the expansion unit of a device for manufacturing hollow resin particles by dry thermal expansion.

As shown in FIG. 3, the expansion unit has the gas inlet tube (not indicated by a number) having a distribution nozzle (11) at its outlet and placed at the center of the part, a collision plate (12) disposed below the distribution nozzle (11), an overheat prevention jacket (10) disposed around the gas inlet tube with a clearance from the tube, and a hot air nozzle (8) disposed around the overheat prevention jacket (10) with a clearance from the jacket. A gas fluid (13) containing heat-expandable microspheres is run through the gas inlet tube in the direction of the arrow, and a gas flow (14) is run through the space between the gas inlet tube and the overheat prevention jacket (10) in the direction of the arrows in order to improve the distribution of the heat-expandable microspheres and prevent overheating of the gas inlet tube and collision plate. Furthermore, a hot airflow (15) is run through the space between the overheat protection jacket (10) and the hot air nozzle (8) in the direction of the arrows in order to thermally expand the heat-expandable micro spheres. The hot airflow (15), the gas fluid (13) and the gas flow (14) usually run in the same direction. A refrigerant flow (9) is run in the overheat prevention jacket (10) in the direction of the arrows in order to cool the jacket.

Operation of the Manufacturing Device

In the injection step, the gas fluid (13) containing heat-expandable microspheres is introduced in the gas inlet tube having the distribution nozzle (11) at its outlet and placed at the inside of the hot airflow (15), and the gas fluid (13) is injected from the distribution nozzle (11).

In the distribution step, the gas fluid (13) is made to collide with the collision plate (12) disposed below the distribution nozzle (11), and the heat-expandable microspheres are uniformly distributed in the hot airflow (15). The gas fluid (13) injected from the distribution nozzle (11) is lead to the collision plate (12) along with the gas flow (14) and collides with the collision plate.

In the expansion step, the distributed heat-expandable microspheres are heated and expanded in the hot airflow (15) at a temperature higher than their expansion-initiation temperature. Then, the resultant hollow resin particles are cooled and collected.

Thermal Expansion Condition and Result

In Example 1, the hollow resin particles 1 were manufactured by thermally expanding heat-expandable microspheres with the manufacturing device shown in FIG. 3, with the expansion parameters including a feeding rate of heat-expandable microspheres at 0.8 kg/min, a flow rate of the gas fluid for distributing heat-expandable microspheres at 0.35 m³/min, a flow rate of the hot airflow at 8.0 m³/min and a temperature of hot airflow at 290° C. The resultant hollow resin particles had a true specific gravity of 0.03. The encapsulation ratio of the blowing agent ($C_2$) in the hollow resin particles was 10.1%.

The temperature of the hot airflow was 280° C. in Example 2, 275° C. in Example 3, 280° C. in Example 4, 260° C. in Example 14, 270° C. in Example 15, 270° C. in Example 16, 280° C. in Comparative Example 1, 285° C. in Comparative Example 6 and 270° C. in Comparative Example 7. The properties of the resultant hollow resin particles are shown in Tables 4 to 6.

Examples 7 to 9 and Comparative Example 5

In Examples 7 to 9 and Comparative Example 5, hollow resin particles were manufactured from the heat-expandable microspheres shown in Tables 4 and 5 in the same manner as Example 1. Then wet-powdery hollow resin particles were manufactured by mixing the resultant hollow resin particles with a liquid organic compound or water according to the formulations shown in Tables 4 and 5 and kneading the mixture. Five samples were selected from different parts of each of the wet-powdery hollow resin particles to confirm that the hollow resin particles were uniformly distributed in the mixture.

Examples 5, 6, 10 to 13 and 17 to 22 and Comparative Examples 2 to 4

In Example 5, 40 parts of the heat-expandable micro spheres produced in Production Example 3 and 60 parts of calcium carbonate (Whiten SB Red, with mean particle size about 1.8 μm determined by laser diffractometry, manufactured by Bihoku Funka Kogyo Co., Ltd.) were mixed in a separable flask, and the mixture was heated to 150° C. with agitation over 5 minutes to be manufactured into the fine-particle-coated hollow resin particles 5. The true specific gravity of the fine-particle-coated hollow resin particles was 0.18, and the true specific gravity of the hollow resin particles without the coating was 0.075. The encapsulation ratio of the blowing agent ($C_3$) was 8.1%.

In Examples 6, 10 to 13 and 17 to 22 and Comparative Examples 2 to 4, fine-particle-coated hollow resin particles were manufactured in the same manner as Example 5 according to the formulations shown in Tables 4 to 6. The mixture was heated to 148° C. in Example 6, 152° C. in Example 10, 156° C. in Example 11, 145° C. in Example 12, 150° C. in Example 13, 145° C. in Example 17, 145° C. in Example 18, 150° C. in Example 19, 165° C. in Example 20, 170° C. in Example 21, 174° C. in Example 22, 150° C. in Comparative Example 2, 145° C. in Comparative Example 3, and 153° C. in Comparative Example 4. The properties of the resultant fine-particle-coated hollow resin particles are shown in Tables 4 to 6.

TABLE 4

| | | Examples | | | | | | | | |
|---|---|---|---|---|---|---|---|---|---|---|
| | | 1 | 2 | 3 | 4 | 5 | 6 | 7 | 8 | 9 |
| Heat-expandable microspheres to be processed into hollow resin particles | | Heat-expandable microspheres 1 | Heat-expandable microspheres 2 | Heat-expandable microspheres 3 | Heat-expandable microspheres 4 | | — | Heat-expandable microspheres 5 | Heat-expandable microspheres 6 | Heat-expandable microspheres 7 |
| Resultant hollow resin particles | | Hollow resin particles 1 | Hollow resin particles 2 | Hollow resin particles 3 | Hollow resin particles 4 | — | — | Hollow resin particles 7 | Hollow resin particles 8 | Hollow resin particles 9 |
| Ingredients of fine-particle-coated hollow resin particles or wet-powdery hollow resin particles | Heat-expandable microspheres | — | — | — | — | Heat-expandable microspheres 3 [40 parts] | Heat-expandable microspheres 4 [35 parts] | — | — | — |
| | Hollow resin particles | — | — | — | — | — | — | Hollow resin particles 7 [15 parts] | Hollow resin particles 8 [10 parts] | Hollow resin particles 9 [10 parts] |
| | Diisononyl phthalate | — | — | — | — | — | — | [85 parts] | — | — |
| | Process oil | — | — | — | — | — | — | — | [90 parts] | — |
| | Water | — | — | — | — | — | — | — | — | [90 parts] |
| | Calcium carbonate | — | — | — | — | [60 parts] | [65 parts] | — | — | — |
| Resultant fine-particle-coated hollow resin particles or wet-powdery hollow resin particles | | — | — | — | — | Fine-particle-coated hollow resin particles 5 | Fine-particle-coated hollow resin particles 6 | Wet-powdery hollow resin particles 7 | Wet-powdery hollow resin particles 8 | Wet-powdery hollow resin particles 9 |
| Properties of particles | Mean particle size of hollow resin particles (D50) [μm] | 136.5 | 94.7 | 63.4 | 43.5 | 60.1 | 38.1 | 43.1 | 92.1 | 66.1 |
| | Amount of organic compound having a vapor pressure higher than 100 kPa at 25° C. in the blowing agent of hollow resin particles (%) | 100 | 100 | 100 | 91 | 100 | 90.8 | 100 | 100 | 100 |
| | True specific gravity of hollow resin particles ($d_2$) | 0.03 | 0.045 | 0.058 | 0.039 | — | — | — | — | — |

TABLE 4-continued

| | | Examples | | | | | | | | |
|---|---|---|---|---|---|---|---|---|---|---|
| | | 1 | 2 | 3 | 4 | 5 | 6 | 7 | 8 | 9 |
| | True specific gravity of hollow resin particles ($d_3$) | — | — | — | — | 0.075 | 0.058 | — | — | — |
| | True specific gravity of hollow resin particles ($d_4$) | — | — | — | — | — | — | 0.067 | 0.053 | — |
| | True specific gravity of hollow resin particles ($d_5$) | — | — | — | — | — | — | — | — | 0.029 |
| | Encapsulation ratio of blowing agent $C_2$ (%) | 10.1 | 11.7 | 8.1 | 8.2 | — | — | — | — | — |
| | Encapsulation ratio of blowing agent $C_3$ (%) | — | — | — | — | 8.1 | 8.3 | — | — | — |
| | Encapsulation ratio of blowing agent $C_4$ (%) | — | — | — | — | — | — | 5.1 | 10 | — |
| | Encapsulation ratio of blowing agent $C_5$ (%) | — | — | — | — | — | — | — | — | 11.1 |
| | Escape initiation temp of blowing agent [° C.] | 120 | 121 | 122 | 125 | 122 | 123 | 122 | 118 | 123 |

TABLE 5

| | | Examles | | | | Comparative Examples | | | | | | |
|---|---|---|---|---|---|---|---|---|---|---|---|---|
| | | 10 | 11 | 12 | 13 | 1 | 2 | 3 | 4 | 5 | 6 | 7 |
| Heat-expandable microspheres to be processed into hollow resin particles | | — | — | — | — | Heat-expandable microspheres 10 | — | — | — | Heat-expandable microspheres 14 | Heat-expandable microspheres 15 | Heat-expandable microspheres 24 |
| Resultant hollow resin particles | | — | — | — | — | Hollow resin particles 14 | — | — | — | Hollow resin particles 18 | Hollow resin particles 19 | Hollow resin particles 29 |
| Ingredients of fine-particle-coated hollow resin particles or wet-powdery hollow resin particles | Heat-expandable microspheres | Heat-expandable microspheres 8 [30 parts] | Heat-expandable microspheres 9 [30 parts] | Heat-expandable microspheres 5 [30 parts] | Heat-expandable microspheres 6 [25 parts] | — | Heat-expandable microspheres 11 [30 parts] | Heat-expandable microspheres 12 [20 parts] | Heat-expandable microspheres 13 [30 parts] | — | — | — |
| | Hollow resin particles | — | — | — | — | — | — | — | — | Hollow resin particles 18 [15 parts] | — | — |
| | Diisononyl phthalate | — | — | — | — | — | — | — | — | [85 parts] | — | — |
| | Process oil | — | — | — | — | — | — | — | — | — | — | — |
| | Water | — | — | — | — | — | — | — | — | — | — | — |
| | Calcium carbonate | [70 parts] | [70 parts] | [70 parts] | [75 parts] | — | [70 parts] | [80 parts] | [70 parts] | — | — | — |
| Resultant fine-particle-coated hollow resin | | Fine-particle-coated | Fine-particle-coated | Fine-particle-coated | Fine-particle-coated | — | Fine-particle-coated | Fine-particle-coated | Fine-particle-coated | Wet-powdery hollow | | |

TABLE 5-continued

|  |  | Examples |  |  |  | Comparative Examples |  |  |  |  |  |  |
|---|---|---|---|---|---|---|---|---|---|---|---|---|
|  |  | 10 | 11 | 12 | 13 | 1 | 2 | 3 | 4 | 5 | 6 | 7 |
| particles or wet-powdery hollow resin particles |  | hollow resin particles 10 | hollow resin particles 11 | hollow resin particles 12 | hollow resin particles 13 |  | hollow resin particles 15 | hollow resin particles 16 | hollow resin particles 17 | resin particles 18 |  |  |
| Properties of particles | Mean particle size of hollow resin particles (D50) [μm] | 60.7 | 156 | 42.5 | 102.3 | 86.1 | 97.2 | 93.1 | 82.3 | 35.1 | 126.3 | 44.6 |
|  | Amount of organic compound having a vapor pressure higher than 100 kPa at 25° C. in the blowing agent of hollow resin particles (%) | 86 | 87.5 | 100 | 100 | 100 | 100 | 100 | 0 | 100 | 30.8 | 0 |
|  | True specific gravity of hollow resin particles ($d_2$) | — | — | — | — | 0.075 | — | — | — | — | 0.017 | 0.030 |
|  | True specific gravity of hollow resin particles ($d_3$) | 0.045 | 0.034 | 0.053 | 0.036 | — | 0.037 | 0.034 | 0.031 | — | — | — |
|  | True specific gravity of hollow resin particles ($d_4$) | — | — | — | — | — | — | — | — | 0.092 | — | — |
|  | True specific gravity of hollow resin particles ($d_5$) | — | — | — | — | — | — | — | — | — | — | — |
|  | Encapsulation ratio of blowing agent $C_2$ (%) | — | — | — | — | 9.6 | — | — | — | — | 17.8 | 16.2 |
|  | Encapsulation ratio of blowing agent $C_3$ (%) | 9.7 | 10 | 5 | 10.1 | — | 9.3 | 14.8 | 10.2 | — | — | — |
|  | Encapsulation ratio of blowing agent $C_4$ (%) | — | — | — | — | — | — | — | — | 1.8 | — | — |
|  | Encapsulation ratio of blowing | | | | | | | | | | | |

TABLE 5-continued

|  | Examples | | | | Comparative Examples | | | | | | |
| --- | --- | --- | --- | --- | --- | --- | --- | --- | --- | --- | --- |
|  | 10 | 11 | 12 | 13 | 1 | 2 | 3 | 4 | 5 | 6 | 7 |
| agent $C_5$ (%) | | | | | | | | | | | |
| Escape initiation temp of blowing agent [° C.] | 122 | 125 | 124 | 126 | 122 | 104 | 100 | 126 | 110 | 105 | 100 |

TABLE 6

| | | Examples | | | | | | | | |
| --- | --- | --- | --- | --- | --- | --- | --- | --- | --- | --- |
| | | 14 | 15 | 16 | 17 | 18 | 19 | 20 | 21 | 22 |
| Heat-expandable microspheres to be processed into hollow resin particles | | Heat-expandable microspheres 16 | Heat-expandable microsphere 17 | Heat-expandable microspheres 18 | — | — | — | — | — | — |
| Resultant hollow resin particles | | Hollow resin particles 20 | Hollow resin particles 21 | Hollow resin particles 22 | — | — | — | — | — | — |
| Ingredients of fine-particle-coated hollow resin particles or wet-powdery hollow resin particles | Heat-expandable microspheres | — | — | — | Heat-expandable microsphere 18 [40 parts] | Heat-expandable microsphere 19 [40 parts] | Heat-expandable microsphere 20 [35 parts] | Heat-expandable microsphere 21 [30 parts] | Heat-expandable microsphere 22 [30 parts] | Heat-expandable microsphere 23 [30 parts] |
| | Hollow resin particles | — | — | — | — | — | — | — | — | — |
| | Diisononyl phthalate | — | — | — | — | — | — | — | — | — |
| | Process oil | — | — | — | — | — | — | — | — | — |
| | Water | — | — | — | — | — | — | — | — | — |
| | Calcium carbonate | — | — | — | [60 parts] | [60 parts] | [65 parts] | [70 parts] | [70 parts] | [70 parts] |
| Resultant fine-particle-coated hollow resin particles or wet-powdery hollow resin particles | | — | — | — | Fine-particle-coated hollow resin particles 23 | Fine-particle-coated hollow resin particles 24 | Fine-particle-coated hollow resin particles 25 | Fine-particle-coated hollow resin particles 26 | Fine-particle-coated hollow resin particles 27 | Fine-particle-coated hollow resin particles 28 |
| Properties of particles | Mean particle size of hollow resin particles (D50) [μm] | 67.9 | 40.1 | 64.1 | 61.8 | 81.9 | 57.5 | 60.2 | 49 | 100 |
| | Amount of organic compound having a vapor pressure higher than 100 kPa at 25° C. in the blowing agent of hollow resin particles (%) | 100 | 100 | 100 | 100 | 100 | 100 | 100 | 100 | 100 |
| | True specific gravity of hollow resin particles ($d_2$) | 0.091 | 0.072 | 0.065 | — | — | — | — | — | — |
| | True specific gravity of hollow resin particles ($d_3$) | — | — | — | 0.07 | 0.082 | 0.042 | 0.042 | 0.042 | 0.042 |
| | True specific gravity of hollow resin particles ($d_4$) | — | — | — | — | — | — | — | — | — |

TABLE 6-continued

| | Examples | | | | | | | | |
|---|---|---|---|---|---|---|---|---|---|
| | 14 | 15 | 16 | 17 | 18 | 19 | 20 | 21 | 22 |
| True specific gravity of hollow resin particles ($d_5$) | — | — | — | — | — | — | — | — | — |
| Encapsulation ratio of blowing agent $C_2$ (%) | 11.0 | 8.5 | 10.4 | — | — | — | — | — | — |
| Encapsulation ratio of blowing agent $C_3$ (%) | — | — | — | 10.5 | 9.4 | 7.4 | 10.9 | 11.0 | 11.2 |
| Encapsulation ratio of blowing agent $C_4$ (%) | — | — | — | — | — | — | — | — | — |
| Encapsulation ratio of blowing agent $C_5$ (%) | — | — | — | — | — | — | — | — | — |
| Escape initiation temp of blowing agent [° C.] | 112 | 110 | 111 | 111 | 111 | 113 | 150 | 162 | 170 |

Test 1

A vinyl chloride compound was prepared by adding 1.43 parts of the hollow resin particles 1 obtained in Example 1 to a vinyl chloride paste (with specific gravity of 1.3) composed of 56 parts of vinyl chloride resin (ZEST-P-21), 92 parts of diisononyl phthalate and 52 parts of calcium carbonate, kneading the mixture and eliminating bubbles by a stirring defoamer. The resultant compound had a true specific gravity of 1.0.

The pressure resistance of the resultant compound was tested according to the above description. The result is shown in Table 7. The hollow resin particles of the present invention have high pressure resistance and exhibited small change in the specific gravity before and after pressurization.

In Tests 2 to 8 and 10 to 28, the pressure resistance of the compounds was tested in the same procedure as Test 1 except that the compounds were prepared with the ingredients shown in Tables 7 to 9.

Test 9

An acrylic compound was prepared by adding 13.79 parts of the wet-powdery hollow resin particles 9 obtained in Example 9 to an acrylic paste (with specific gravity of 1.3) composed of 135 parts of 50-% acrylic resin emulsion and 65 parts of calcium carbonate, kneading the mixture and eliminating bubbles by a stirring defoamer. The resultant compound had a true specific gravity of 1.0.

The pressure resistance of the resultant compound was tested according to the above description. The result is shown in Table 7.

TABLE 7

| | | | Test 1 | Test 2 | Test 3 | Test 4 | Test 5 | Test 6 | Test 7 | Test 8 | Test 9 | Test 10 |
|---|---|---|---|---|---|---|---|---|---|---|---|---|
| Vinyl chloride or acrylic compound | Light-weight filler | | Hollow resin particles 1 | Hollow resin particles 2 | Hollow resin particles 3 | Hollow resin particles 4 | Fine-particle-coated hollow resin particles 5 | Fine-particle-coated hollow resin particles 6 | Fine-particle-coated hollow resin particles 7 | Fine-particle-coated hollow resin particles 8 | Fine-particle-coated hollow resin particles 9 | Fine-particle-coated hollow resin particles 10 |
| | | Amount [part] | 1.43 | 2.17 | 2.84 | 1.87 | 10.13 | 8.79 | 21.72 | 23.78 | 13.79 | 7.51 |
| | | True specific gravity | 0.03 | 0.045 | 0.058 | 0.039 | 0.18 | 0.16 | 0.32 | 0.34 | 0.23 | 0.14 |
| | Resin | Vinyl chloride resin [part] | 56 | 56 | 56 | 56 | 56 | 56 | 56 | 56 | — | 56 |
| | Plasticizer | Diisononyl phthalate [part] | 92 | 92 | 92 | 92 | 92 | 92 | 92 | 92 | — | 92 |
| | Filler | Calcium carbonate [part] | 52 | 0 | 52 | 52 | 52 | 52 | 52 | 52 | 65 | 52 |
| | Resin | 50-% Acrylic resin | — | — | — | — | — | — | — | — | 135 | — |

TABLE 7-continued

|  |  |  | Test 1 | Test 2 | Test 3 | Test 4 | Test 5 | Test 6 | Test 7 | Test 8 | Test 9 | Test 10 |
|---|---|---|---|---|---|---|---|---|---|---|---|---|
|  |  | emulsion [part] |  |  |  |  |  |  |  |  |  |  |
|  | True specific gravity of compound before pressurization |  | 1.00 | 1.00 | 1.00 | 1.00 | 1.00 | 1.00 | 1.00 | 1.00 | 1.00 | 1.00 |
| True specific gravity of compound after pressurization | 10 MPa for 1 h |  | 1.03 | 1.02 | 1.05 | 1.10 | 1.08 | 1.07 | 1.06 | 1.05 | 1.07 | 1.05 |
|  | 20 MPa for 1 h |  | 1.08 | 1.07 | 1.10 | 1.14 | 1.13 | 1.16 | 1.12 | 1.11 | 1.11 | 1.10 |
|  | 20 MPa for 24 h |  | 1.10 | 1.13 | 1.13 | 1.18 | 1.16 | 1.17 | 1.17 | 1.13 | 1.18 | 1.16 |
|  | 30 MPa for 1 h |  | 1.12 | 1.16 | 1.16 | 1.21 | 1.16 | 1.20 | 1.18 | 1.15 | 1.22 | 1.18 |

TABLE 8

|  |  |  | Test 11 | Test 12 | Test 13 | Test 14 | Test 15 | Test 16 | Test 17 | Test 18 | Test 19 |
|---|---|---|---|---|---|---|---|---|---|---|---|
| Vinyl chloride or acrylic compound | Light-weight filler |  | Fine-particle-coated hollow resin particles 11 | Fine-particle-coated hollow resin particles 12 | Fine-particle-coated hollow resin particles 13 | Hollow resin particles 14 | Fine-particle-coated hollow resin particles 15 | Fine-particle-coated hollow resin particles 16 | Fine-particle-coated hollow resin particles 17 | Wet-powdery hollow resin particles 18 | Hollow resin particles 19 |
|  |  | Amount [part] | 5.70 | 9.39 | 7.39 | 3.74 | 6.29 | 8.79 | 5.13 | 30.77 | 0.80 |
|  |  | True specific gravity | 0.11 | 0.17 | 0.138 | 0.075 | 0.12 | 0.16 | 0.1 | 0.4 | 0.017 |
|  | Resin | Vinyl chloride resin [part] | 56 | 56 | 56 | 56 | 56 | 56 | 56 | 56 | 56 |
|  | Plasticizer | Diisononyl phthalate [part] | 92 | 92 | 92 | 92 | 92 | 92 | 92 | 92 | 92 |
|  | Filler | Calcium carbonate [part] | 52 | 52 | 52 | 52 | 52 | 52 | 52 | 52 | 52 |
|  | Resin | 50-% Acrylic resin emulsion [part] | — | — | — | — | — | — | — | — | — |
|  | True specific gravity of compound before pressurization |  | 1.00 | 1.00 | 1.00 | 1.00 | 1.00 | 1.00 | 1.00 | 1.00 | 1.00 |
| True specific gravity of compound after pressurization | 10 MPa for 1 h |  | 1.04 | 1.03 | 1.06 | 1.27 | 1.28 | 1.29 | 1.30 | 1.27 | 1.29 |
|  | 20 MPa for 1 h |  | 1.10 | 1.10 | 1.11 | 1.30 | 1.30 | 1.30 | 1.30 | 1.30 | 1.30 |
|  | 20 MPa for 24 h |  | 1.11 | 1.15 | 1.12 | 1.30 | 1.30 | 1.30 | 1.30 | 1.30 | 1.30 |
|  | 30 MPa for 1 h |  | 1.13 | 1.17 | 1.16 | 1.30 | 1.30 | 1.30 | 1.30 | 1.30 | 1.30 |

TABLE 9

|  |  | Test 20 | Test 21 | Test 22 | Test 23 | Test 24 | Test 25 | Test 26 | Test 27 | Test 28 |
|---|---|---|---|---|---|---|---|---|---|---|
| Vinyl chloride or acrylic compound | Light-weight filler | Hollow resin particles 20 | Hollow resin particles 21 | Hollow resin particles 22 | Fine-particle-coated hollow resin particles 23 | Fine-particle-coated hollow resin particles 24 | Fine-particle-coated hollow resin particles 25 | Fine-particle-coated hollow resin particles 26 | Fine-particle-coated hollow resin particles 27 | Fine-particle-coated hollow resin particles 28 |

TABLE 9-continued

|  |  | Test 20 | Test 21 | Test 22 | Test 23 | Test 24 | Test 25 | Test 26 | Test 27 | Test 28 |
|---|---|---|---|---|---|---|---|---|---|---|
|  | Amount [part] | 4.62 | 3.58 | 3.21 | 9.32 | 11.25 | 6.12 | 7.51 | 7.51 | 7.51 |
|  | True specific gravity | 0.091 | 0.072 | 0.065 | 0.168 | 0.196 | 0.117 | 0.14 | 0.14 | 0.14 |
| Resin | Vinyl chloride resin [part] | 56 | 56 | 56 | 56 | 56 | 56 | 56 | 56 | 56 |
| Plasticizer | Diisononyl phthalate [part] | 92 | 92 | 92 | 92 | 92 | 92 | 92 | 92 | 92 |
| Filler | Calcium carbonate [part] | 52 | 52 | 52 | 52 | 52 | 52 | 52 | 52 | 52 |
| Resin | 50-% Acrylic resin emulsion [part] | — | — | — | — | — | — | — | — | — |
| True specific gravity of compound before pressurization |  | 1.00 | 1.00 | 1.00 | 1.00 | 1.00 | 1.00 | 1.00 | 1.00 | 1.00 |
| True specific gravity of compound after pressurization | 10 MPa for 1 h | 1.03 | 1.05 | 1.05 | 1.04 | 1.04 | 1.06 | 1.04 | 1.02 | 1.06 |
|  | 20 MPa for 1 h | 1.08 | 1.09 | 1.09 | 1.09 | 1.10 | 1.11 | 1.09 | 1.10 | 1.13 |
|  | 20 MPa for 24 h | 1.14 | 1.15 | 1.16 | 1.14 | 1.12 | 1.17 | 1.14 | 1.16 | 1.15 |
|  | 30 MPa for 1 h | 1.15 | 1.15 | 1.14 | 1.12 | 1.14 | 1.20 | 1.15 | 1.14 | 1.20 |

Figure 4:
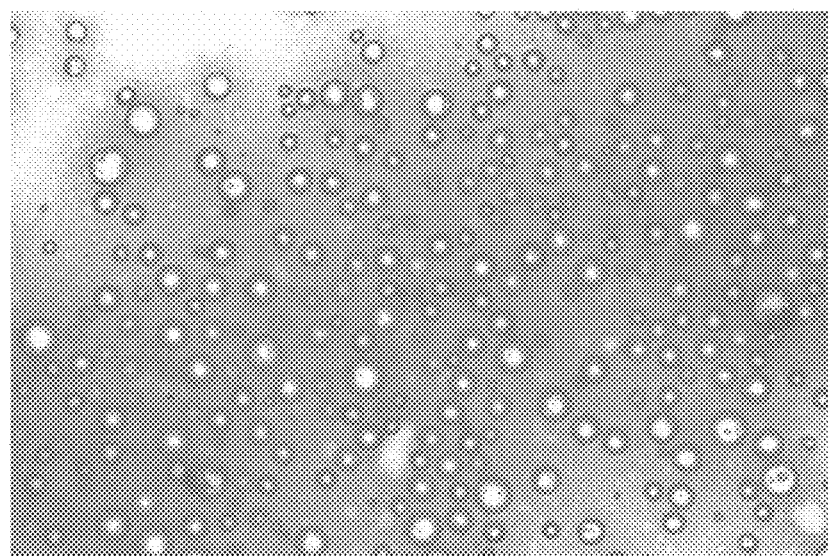
FIG. 4 is an optical photomicrograph of a compound pressurized at 20 MPa for 1 hour in Test 1.

The hollow resin particles, fine-particle-coated hollow resin particles and wet-powdery hollow resin particles of the present invention have high pressure resistance, and thus the compounds in Tests 1 to 13 and 20 to 28 resulted in minimum change in specific gravity before and after pressurization. The compound after pressurization at 20 MPa for 1 hour in Test 1 was observed through an optical microscope to inspect the state of the hollow resin particles in the compound. The result is shown in FIG. 4. A large number of remaining hollow resin particles were found in the compound in FIG. 4.

Figure 5:
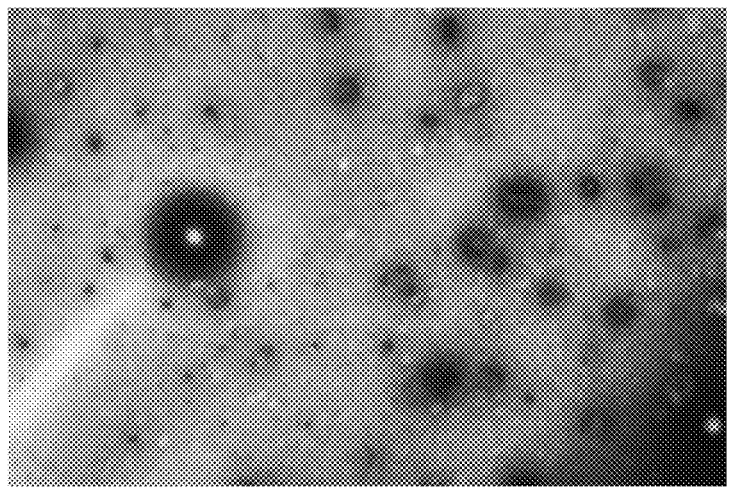
FIG. 5 is an optical photomicrograph of a compound pressurized at 20 MPa for 1 hour in Test 14.

On the other hand, all of the compounds after pressurization at 20 MPa for 1 hour in Tests 14 to 19 had a specific gravity of 1.3, which demonstrates that the hollow resin particles in the compounds did not function as a lightweight filler. The compound after pressurization at 20 MPa for 1 hour in Test 14 was observed through an optical microscope to inspect the state of the hollow resin particles in the compound. The result is shown in FIG. 5. Almost no hollow resin particles remained in the compound in FIG. 5.

Figure 6:
FIG. 6 is an electron photomicrograph of hollow resin particles 14 after pressurizing a mixture containing the hollow resin particles 14 and diisononyl phthalate at 20 MPa for 1.

As mentioned above, the hollow resin particles in the compound in Test 14 could not be found through an optical microscope. For the purpose of inspecting the state of the hollow resin particles in a compound, a mixture containing 92 parts of diisononyl phthalate and 3.74 parts of the hollow resin particles was prepared and pressurized at 20 MPa for 1 hour in the same manner as that in Test 14. After the pressurization, the hollow resin particles were taken out and inspected through an electron microscope. The result is shown in FIG. 6. Most of the hollow resin particles were found to be dented, and hollow resin particles keeping a hollow part were not found due to their poor pressure resistance. Thus, no lightweight effect by the particles was observed.

Curable Composition

Five curable compositions were prepared according to the formulae shown in Table 10.

Specifically 100 parts by weight of Kaneka MS Polymer 5203, 60 parts by weight of diisononyl phthalate, 120 parts by weight of calcium carbonate and 2 parts by weight of DISPARLON 6500 manufactured by Kusumoto Chemicals, Ltd. as a thixotropic agent were kneaded well in a planetary mixer. Then the respective lightweight fillers shown in Table 10 and 1 part by weight of dibutyltin bis(2,4-pentanedionate) as a curing catalyst were added to the mixture to prepare the curable compositions, and each of the compositions was charged in a 330-mL airtight cartridge.

The true specific gravity and the post-dispense drooling of the curable compositions were tested in the following methods.

True Specific Gravity of Curable Compositions

The specific gravity of a curable composition was determined with a 50-mL specific gravity cup by filling the cup with the composition not to take in the air.

Post-Dispense Drooling of Curable Compositions

A curable composition was dispensed about 4 cm long from a 330-mL cartridge using a dispensing gun. Immediately after the dispensing gun was stopped, the curable composition dispensed from the cartridge was removed. After 3 seconds, the cartridge was stood and the curable composition drooling from the nozzle of the cartridge was collected until the composition stopped drooling. Then the collected composition was weighed. The collection was conducted twice for each of the curable compositions.

The post-dispense drooling of the curable composition was evaluated based on the weight of the collected composition according to the following criteria.

Weight of collected composition ≤0.3 g: good
Weight of collected composition >0.3 g: poor
The result is shown in Table 10.

TABLE 10

|  |  | Example | Example | Example | Comparative Example | Comparative Example |
|---|---|---|---|---|---|---|
| Kaneka MS Polymer S203 [part] | | 100 | 100 | 100 | 100 | 100 |
| Diisononyl phthalate [part] | | 60 | 60 | 60 | 60 | 60 |
| Calcium carbonate [part] | | 120 | 120 | 120 | 120 | 120 |
| DISPARLON 6500 [part] | | 2 | 2 | 2 | 2 | 2 |
| Light-weight filler | | Fine-particle-coated hollow resin particles 6 | Fine-particle-coated hollow resin particles 10 | Fine-particle-coated hollow resin particles 10 | Fine-particle-coated hollow resin particles 15 | Hollow resin particles 29 |
| | True specific gravity | 0.16 | 0.14 | 0.14 | 0.12 | 0.03 |
| | Amount [part] | 6 | 5 | 11 | 6 | 2 |
| Dibutyltin bis (2,4-pentanedionate) [part] | | 1 | 1 | 1 | 1 | 1 |
| True specific gravity of curable composition | | 1.12 | 1.07 | 0.99 | 1.07 | 0.99 |
| Post-dispense drooling | 1st [g] | 0.31 | 0.11 | 0.29 | 1.92 | 0.49 |
| | 2nd [g] | 0.27 | 0.07 | 0.31 | 1.79 | 0.55 |
| | Ave. [g] | 0.29 | 0.09 | 0.30 | 1.86 | 0.52 |
| | Evaluation | good | good | good | poor | poor |

The hollow resin particles of the present invention have sufficient pressure resistance, and are not deformed by the low pressure applied to the hollow resin particles when a curable composition containing the particles is dispensed from a cartridge by a dispensing gun. Thus the post-dispense drooling of a curable composition containing the hollow resin particles is minimized.

INDUSTRIAL APPLICABILITY

The present invention provides hollow resin particles having an extremely higher pressure resistance than conventional hollow resin particles.

The hollow resin particles of the present invention are highly advantageous for practical use owing to a remarkably decreased rupture or denting of the hollow resin particles under a high pressure as compared to conventional hollow resin particles. The hollow resin particles of the present invention are preferably used in applications including, for example, automotive body sealants, automotive undercoat materials, automotive damping paints and sealants for buildings.

The present invention provides a remarkable effect which is the contribution to widening the application of hollow resin particles.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the invention.

The invention claimed is:

1. Hollow resin particles comprising a thermoplastic resin shell and a hollow part surrounded by the shell;
    wherein the thermoplastic resin is a polymer produced from a polymerizable component containing 0.6 to 3.0 wt % of a crosslinkable monomer having at least two polymerizable carbon-carbon double bonds per molecule and 97 to 99.4 wt % of an uncrosslinkable monomer having one polymerizable carbon-carbon double bond per molecule;
    wherein a blowing agent is encapsulated in the hollow resin particles and the blowing agent contains 50 to 100 wt % of an organic compound having a vapor pressure higher than 100 kPa at 25° C.; and
    wherein the encapsulation ratio of the blowing agent ranges from 3 to 13 wt % of the hollow resin particles.

2. The hollow resin particles as claimed in claim 1, wherein the uncrosslinkable monomer contains a nitrile monomer in an amount ranging from 70 to 99.8 wt % of the uncrosslinkable monomer.

3. The hollow resin particles as claimed in claim 2, wherein the amount of acrylonitrile in the uncrosslinkable monomer ranges from 60 to 93 wt %.

4. The hollow resin particles as claimed in claim 2, wherein the nitrile monomer contains acrylonitrile and methacrylonitrile in a weight ratio of acrylonitrile to methacrylonitrile ranging from 65:35 to 99:1.

5. The hollow resin particles as claimed in claim 2, wherein the uncrosslinkable monomer contains acrylonitrile and methyl methacrylate, and the total amount of the acrylonitrile and methyl methacrylate ranges from 90 to 100 wt % of the uncrosslinkable monomer.

6. The hollow resin particles as claimed in claim 1, wherein the escape-initiation temperature of the blowing agent is not lower than 110° C.

7. Fine-particle-coated hollow resin particles comprising the hollow resin particles as claimed in claim 1 and a fine particle coating the outer surface of the shell of the hollow resin particles.

8. Wet-powdery hollow resin particles comprising the hollow resin particles as claimed in claim 1 and a liquid organic compound or water.

9. A process for producing hollow resin particles comprising;
    a step 1 which comprises dispersing an oily mixture containing a polymerizable component and a blowing agent in an aqueous dispersion medium and polymerizing the polymerizable component into heat-expandable microspheres; and a step 2 which comprises thermally expanding the heat-expandable microspheres produced in the step 1;

wherein, in the step 1, the polymerizable component contains 0.6 to 3.0 wt % of a crosslinkable monomer having at least two polymerizable carbon-carbon double bonds per molecule and 97 to 99.4 wt % of an uncrosslinkable monomer having one polymerizable carbon-carbon double bond per molecule, the amount of the blowing agent ranges from 4 to 15 parts by weight to 100 parts by weight of the polymerizable component, and the blowing agent contains 50 to 100 wt % of an organic compound having a vapor pressure higher than 100 kPa at 25° C.

10. The process for producing hollow resin particles as claimed in claim 9, wherein the true specific gravity of the heat-expandable microspheres produced in the step 1 ranges from 1.02 to 1.3.

11. A composition comprising a base component and the hollow resin particles as claimed in claim 1.

12. A formed product manufactured by forming or molding the composition as claimed in claim 11.

13. A composition comprising a base component and the fine-particle-coated hollow resin particles as claimed in claim 7.

14. A composition comprising a base component and the wet-powdery hollow resin particles as claimed in claim 8.

15. A formed product manufactured by forming or molding the composition as claimed in claim 13.

16. A formed product manufactured by forming or molding the composition as claimed in claim 14.

* * * * *